US007519003B2

(12) United States Patent
Koziy et al.

(10) Patent No.: US 7,519,003 B2
(45) Date of Patent: Apr. 14, 2009

(54) SYSTEM AND METHOD FOR ELECTRONICALLY IDENTIFYING CONNECTIONS OF A CROSS-CONNECT SYSTEM

(75) Inventors: Robert J. Koziy, Burnsville, MN (US); Gregory C. Pfeiffer, Bloomington, MN (US); Leah E. Danzinger, Minnetonka, MN (US); John C. Keller, Minneapolis, MN (US); Eric Kar-Wing Sit, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1584 days.

(21) Appl. No.: 10/017,653

(22) Filed: Dec. 12, 2001

(65) Prior Publication Data

US 2002/0071394 A1 Jun. 13, 2002

Related U.S. Application Data

(63) Continuation of application No. 08/972,159, filed on Nov. 17, 1997, now Pat. No. 6,421,322.

(51) Int. Cl.
*H04J 3/14* (2006.01)

(52) U.S. Cl. ....................................... 370/248; 370/380

(58) Field of Classification Search ....................... None
See application file for complete search history.

(56) References Cited

U.S. PATENT DOCUMENTS

| | | | |
|---|---|---|---|
| 4,840,568 | A | 6/1989 | Burroughs et al. |
| 4,901,004 | A | 2/1990 | King |
| 4,916,444 | A | 4/1990 | King |
| 4,968,929 | A | 11/1990 | Hauck et al. |
| 5,052,940 | A | 10/1991 | Bengal |
| 5,107,532 | A | 4/1992 | Hansen et al. |
| 5,161,988 | A | 11/1992 | Krupka |
| 5,166,970 | A | 11/1992 | Ward |
| 5,195,902 | A | 3/1993 | Bengal |
| 5,394,503 | A | 2/1995 | Dietz, Jr. et al. |
| 5,483,467 | A | 1/1996 | Krupka et al. |

(Continued)

FOREIGN PATENT DOCUMENTS

| | | |
|---|---|---|
| DE | 3918144 | 12/1990 |

(Continued)

*Primary Examiner*—Chi H. Pham
*Assistant Examiner*—Soon D. Hyun
(74) *Attorney, Agent, or Firm*—Fogg & Powers LLC

(57) ABSTRACT

A system and method for electronically identifying connections established through a cross-connect system provides for identification of all hard-wired and temporary patch connections, and any modifications made to same. Connection identification and status information is acquired in near real-time and stored in a database which is accessible by a user through a graphical user interface (GUI). The TRACE or lamp wires which connect respective pairs of cross-connect circuits are utilized in an unconventional manner so as to form a scanning bus. The information signal paths established through the cross-connect circuits remain undisturbed. A scanning signal is communicated between each pair of cross-connected circuits over the TRACE conductor. In the event a patch cord is used to temporarily redirect a signal connection, the scanning signal is transmitted over the shield or sleeve conductor of the patch cord. The scanning signal provides identification and other information concerning the transmitting circuit.

32 Claims, 31 Drawing Sheets

U.S. PATENT DOCUMENTS

| | | | | | |
|---|---|---|---|---|---|
| 5,523,747 | A | | 6/1996 | Wise | |
| 5,631,902 | A | | 5/1997 | Yoshifuji | |
| 5,793,909 | A | * | 8/1998 | Leone et al. | 385/24 |
| 5,821,510 | A | * | 10/1998 | Cohen et al. | 235/375 |
| 5,929,425 | A | * | 7/1999 | Kanno | 235/472.01 |
| 5,982,744 | A | | 11/1999 | Cantwell et al. | |
| 6,002,692 | A | * | 12/1999 | Wills | 370/465 |

FOREIGN PATENT DOCUMENTS

| | | | |
|---|---|---|---|
| EP | 317852 | A2 | 5/1989 |
| EP | 383931 | A1 | 8/1990 |
| EP | 687115 | A1 | 12/1995 |
| EP | 687115 | A2 | 12/1995 |
| EP | 0 700 193 | | 3/1996 |
| GB | 2236398 | A | 4/1991 |
| WO | WO 98/03022 | | 1/1998 |

* cited by examiner

| CIRCUIT A | | | |
|---|---|---|---|
| XMIT ID | RCV ID | COLLISION? | MONITOR RCVR? |
| 1 | 1 | No | Yes |
| 0 | 0 | No | No |
| 0 | 0 | No | No |
| • | • | • | • |
| • | • | • | • |
| • | • | • | • |

| CIRCUIT B | | | |
|---|---|---|---|
| XMIT ID | RCV ID | COLLISION? | MONITOR RCVR? |
| 1 | 1 | No | Yes |
| 0 | 0 | No | No |
| 1 | 0 | Yes | Yes |
| CIRCUIT B DECLARED A RECEIVER | | | |

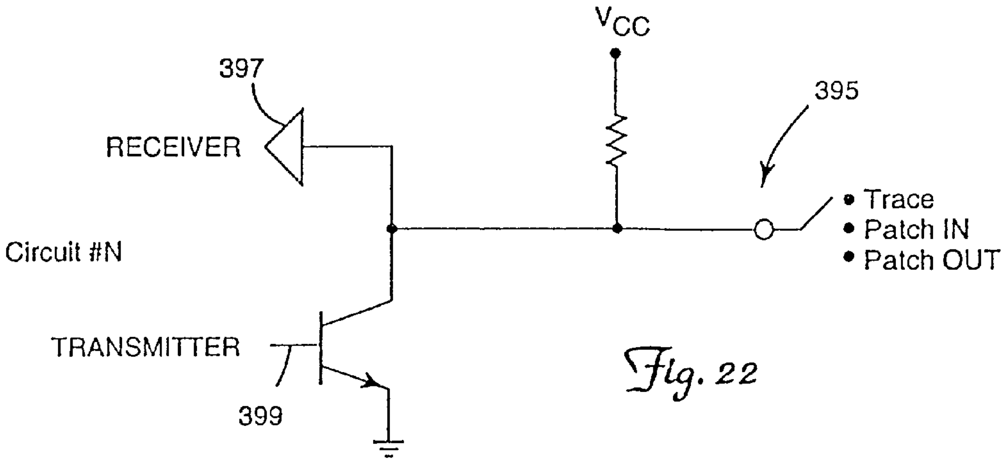
Fig. 22
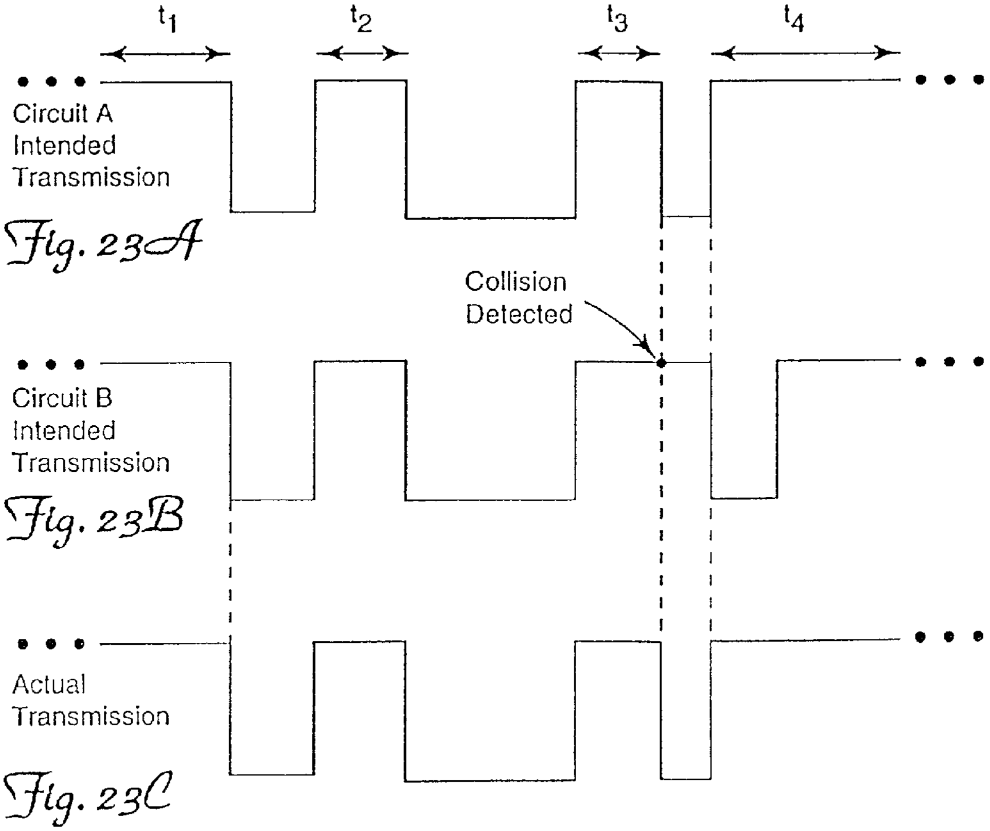
Fig. 23A
Fig. 23B
Fig. 23C

Fig.27
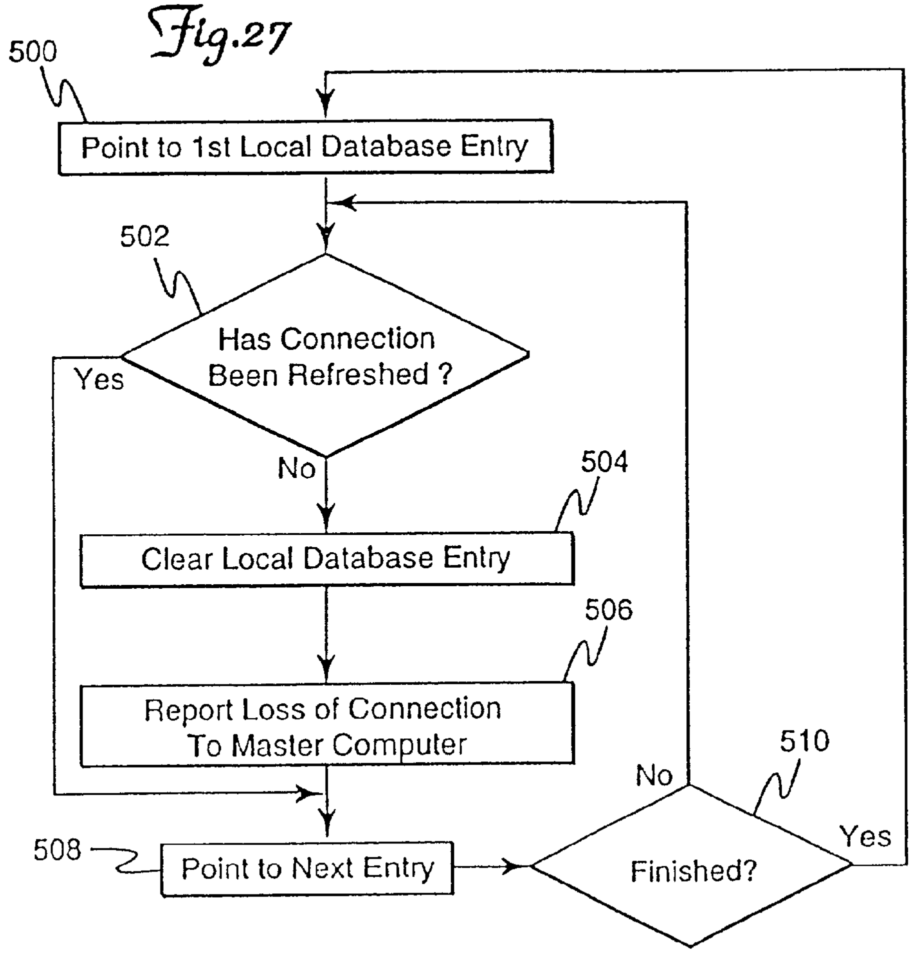
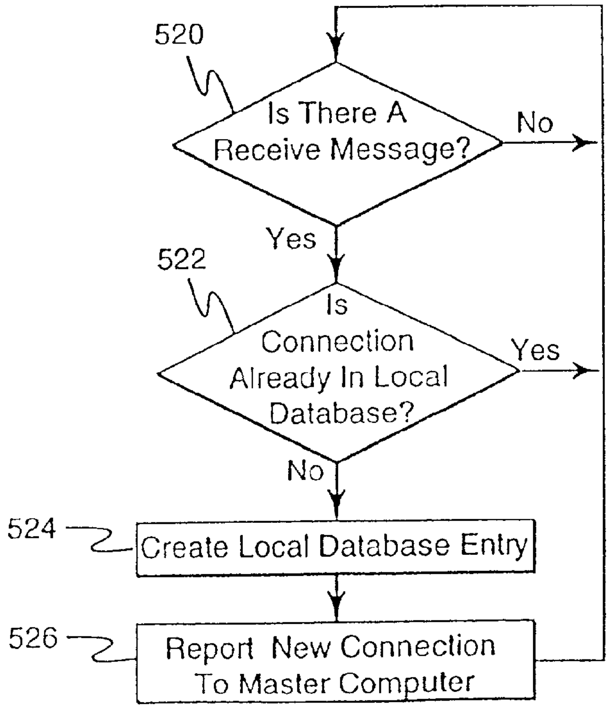
Fig.28

DSXPERT X-CONN INFO SCREEN

FACILITY

Central Office: Malibu
Floor: Main
Bay: 1
Panel: 6
Circuit: 64
CLLI: MALTOLL10
STATUS: Connected

EQUIPMENT

Central Office: Malibu
Floor: Main
Bay: 1
Panel: 7
Circuit: 18
CLLI: Fiber-route1
STATUS: Connected

GENERAL INFORMATION

Install Date: 11/10/97
Last Patch Date: 11/12/97
Last Patch Location: Bay1-PNL2-CCT12
Last Patch CLLI: Fiber-route4
Priority: 1
Emergency Patch Location: Bay2-PNL3-CCT20
Comments: Malibu Toll Route

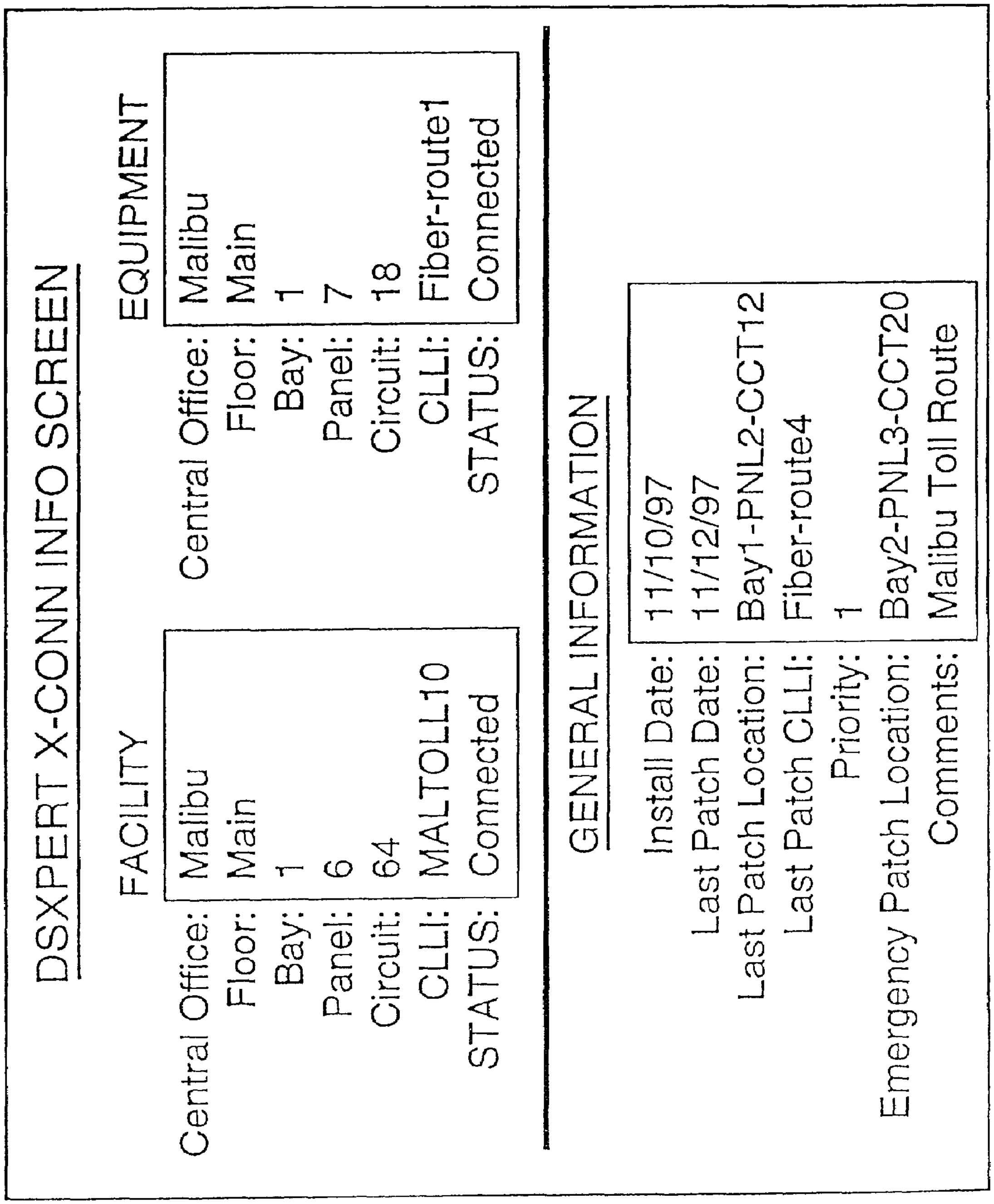

Fig. 35

SYSTEM AND METHOD FOR ELECTRONICALLY IDENTIFYING CONNECTIONS OF A CROSS-CONNECT SYSTEM

This is a continuation of application Ser. No. 08/972,159, filed Nov. 17, 1997 now U.S. Pat. No. 6,421,322. The application is incorporated herein by reference.

BACKGROUND OF THE INVENTION

The present invention relates generally to communications systems, and more particularly, to a system and method for electronically identifying all connections established through a cross-connect system.

Cross-connect systems are widely used in the telecommunications industry to effect signal line connections between various types of communications equipment managed by different information service providers. Within a central office or exchange environment, for example, tens of thousands of information signal lines from a first communications equipment facility must be connected to respective signal lines from a second communications equipment facility in a manner that provides for a high degree of connection reliability. To this end, industry-standard cross-connect systems typically utilize highly-reliable passive connection devices, often termed cross-connect circuits, to effect the required signal line connections. In a typical application, a pair of cross-connect circuits are used to connect a single signal line of a first equipment facility with a single signal line of a second equipment facility.

Identifying the specific location and determining the status of all cross-connected circuits within a central office has heretofore required varying degrees of manual intervention, such as manually tracing a hard-wired or temporary patch connection in an effort to identify the location of the cross-connect circuits terminating opposing ends of each connection. It can be readily appreciated that manually acquiring connection information and updating this information on a regular basis represents a sizable and costly challenge.

It would appear that introducing active electronic components within the information signal paths would provide the opportunity to implement a cost effective and efficient means of acquiring connection information for a cross-connect system. A number of proposed prior art solutions require the introduction of active electronics into the information signal paths in order to effect transmissions between cross-connected circuits. Various time-sharing and frequency multiplexing schemes have been proposed that require sharing of the information signal paths, in terms of transmission time or frequency bandwidth, which necessarily require the implementation of a collision detection and resolution scheme in order to reduce the likelihood of disturbing information signal transmissions over the connections.

Introducing active components into the information signal circuit paths, however, has proven to systemically reduce the overall reliability of certain cross-connect systems to unacceptable levels. The possibility of information signal disruption and the possible malfunction or failure of the active electronics within the information signal conductivity path has prompted most, if not all, manufacturers of cross-connect systems to exclusively use passive cross-connect components within the information signal path. Although passive connection devices provide a requisite level of reliability, such passive devices significantly complicate the effort of developing a fully automatic, electronic implementation for identifying the location and status of all cross-connected circuits and connections established through a central office. The present invention provides such an implementation.

SUMMARY OF THE INVENTION

The present invention is directed to a system and method for electronically identifying connections established through a cross-connect system. The present invention provides for the identification of all hard-wired and temporary patch connections, and any modifications made to existing cross-connect circuit connections. Connection identification and status information is acquired in near real-time and stored in a database which is accessible by a user through a graphical user interface (GUI).

TRACE or lamp wires, which are connected between respective pairs of cross-connect circuits in accordance with a standard industry practice, are utilized in an unconventional manner so as to form a scanning bus. The information signal paths established through the cross-connect circuits remain undisturbed. A scanning signal is communicated between each pair of cross-connected circuits over the TRACE conductor. In the event a patch cord is used to temporarily redirect a signal connection, the scanning signal is transmitted over the shield or sleeve conductor of the patch cord, the patch cord shield thus being incorporated as part of the overall scanning bus. The scanning signal provides identification and other information concerning the transmitting circuit.

A circuit receiving the scanning signal communicates its identification information and that of the transmitting circuit derived from the scanning signal to a central computer. The identification information acquired by the central computer from all receiving cross-connect circuits provides identification and status information for all circuits within the cross-connect system. In one embodiment, all circuits of a cross-connect system are scanned and identification information acquired in the time required to transmit a single cross-connect circuit ID bit string, irrespective of the total number of cross-connect circuits included within the cross-connect system.

Various types of information concerning each connection established within a cross-connect system is maintained in a database and updated in near real-time so as to reflect the current state of all circuit connections. A graphical user interface cooperates with the database to provide a user the ability to access connection records of interest, to visually display simulated depictions of selected connections, and to generate a variety of reports derived from the connection information maintained in the database. The graphical user interface may also be used to guide a technician to specific circuit locations to effect repairs, establish a new connection or redirect an existing connection through use of a patch cord.

A "patch pending" file may be created which indicates various connections or disconnections to be effected by a technician to accomplish a particular objective. A patch pending file typically contains information identifying the specific sequence by which patch cord installation or removal is to be accomplished. When executed, the patch pending file may control multi-colored TRACE LEDs of specified circuits as a means of visually directing the work of a technician when establishing and breaking cross-connections.

A patch pending file may also be created to provide information concerning contingent or back-up connections that may be established in the event of a network outage. Such a patch pending file may identify important circuits which require immediate restoration during temporary or extended outages. Upon occurrence of an actual system outage, an appropriate patch pending file may be selected and executed to implement an efficient, coordinated patching procedure for restoring key circuits.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 22 is a schematic illustration of one embodiment of the collision detection circuit shown in FIG. 20;

FIGS. 23A-23C illustrate timing diagrams associated with the operation of the collision detection circuit shown in FIG. 22;

FIGS. 27-28 respectively illustrate a lost connection and new connection monitoring procedure in accordance with one embodiment of the present invention and;

FIGS. 29-36 illustrate various information screens which are displayable to a user of the intelligent cross-connect system through use of a graphical user interface which cooperatively operates with a cross-connect database.

Figure 1:
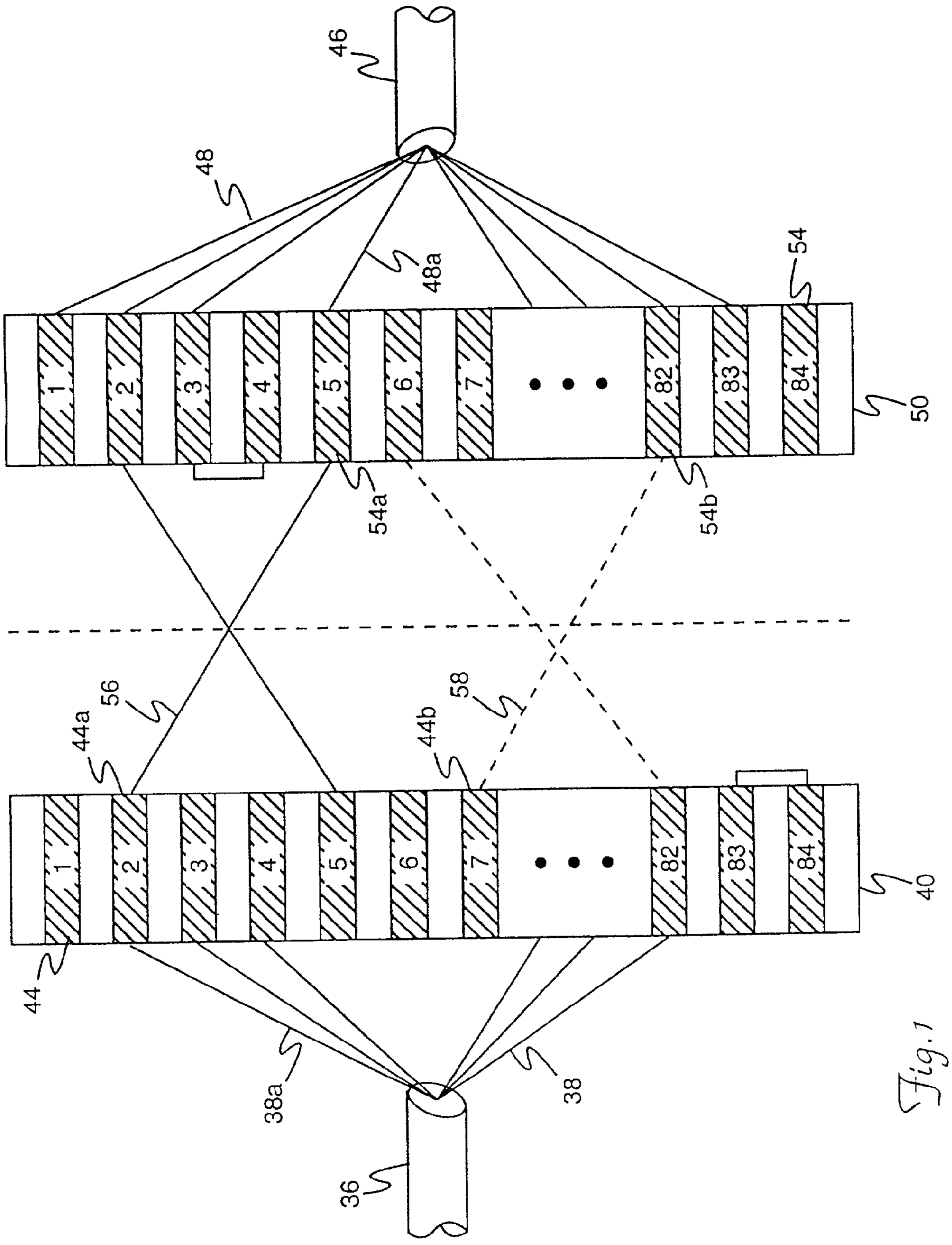
FIG. 1 is an illustration of a cross-connect apparatus which is typically employed by an information service provider for terminating, cross-connecting, and accessing a number of communication lines.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENT

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Referring to the drawings, and in particular to FIG. 1, there is provided a generalized depiction of a cross-connect apparatus which provides a situs for terminating, cross-connecting, and accessing a number of transmission lines capable of communicating signals of varying types. A number of the cross-connect apparatuses of the type shown in FIG. 1 are typically installed in equipment frames or bays and interconnected as part of a telephony network. The cross-connect bays serve as a centralized hubs for interconnecting various types of equipment which may communicate information at various data rates.

By way of example, a digital trunk 36 includes a number of signal lines 38 associated with a first communications equipment facility, each of the signal lines 38 being terminated or otherwise coupled to a respective cross-connect circuit 44 installed in a patch panel or shelf 40. A second digital trunk 46 operated by a second communications equipment facility includes a number of signal lines 48 which are terminated on respective cross-connect circuits 54 mounted in a second patch panel or shelf 50. Individual circuits 44 of shelf 40 are typically "cross-connected" to respective circuits 54 of shelf 50 through use of either hard-wired connections or temporary patch connections established therebetween. As such, a digital signal transmitted through signal line 38a of the digital trunk 36, for example, is cross-connected to signal line 48a of the digital trunk 46 over cross-connected circuits 44a and 54a respectively mounted in patch shelves 40 and 50. It is noted that circuits 44a, 54a of patch shelves 40, 50 are connected via a hard-wired connection 56 in the depiction provided in FIG. 1, but may alternatively be established through use of a temporary patch connection, such as patch connection 58 connecting circuits 44b and 54b.

At a typical central office site, tens or hundreds of thousands of signal lines must be properly interconnected, identified, and managed in order to provide an acceptable level of system integrity and reliability. Identifying the specific location of all interconnected circuits within a central office is a long-standing problem which heretofore has been only partially addressed. A cross-connect tracking system and methodology in accordance with the principles of the present invention fully addresses the complex problem of identifying all interconnected cross-connect circuits established through a central office, and further identifies whether such interconnections are established over a hard-wired or temporary patch connection. Any modifications made to existing circuit connections are detected in near real-time, whether such modifications are established over hard-wired or patch connections.

In one embodiment, various types of information concerning each connection established within the central office is maintained in a database which is updated in near real-time so as to reflect the current state of all connections. A graphical user interface cooperates with the database, typically under user control, and provides a user the ability to access connection records of interest, to visually display simulated depictions of selected connections, and to generate a variety of reports derived from the connection information maintained in the database. The graphical user interface may also be used to guide a technician through a maze of connections to specific circuit locations which may require repair or redirection through use of a patch cord.

Figure 2:
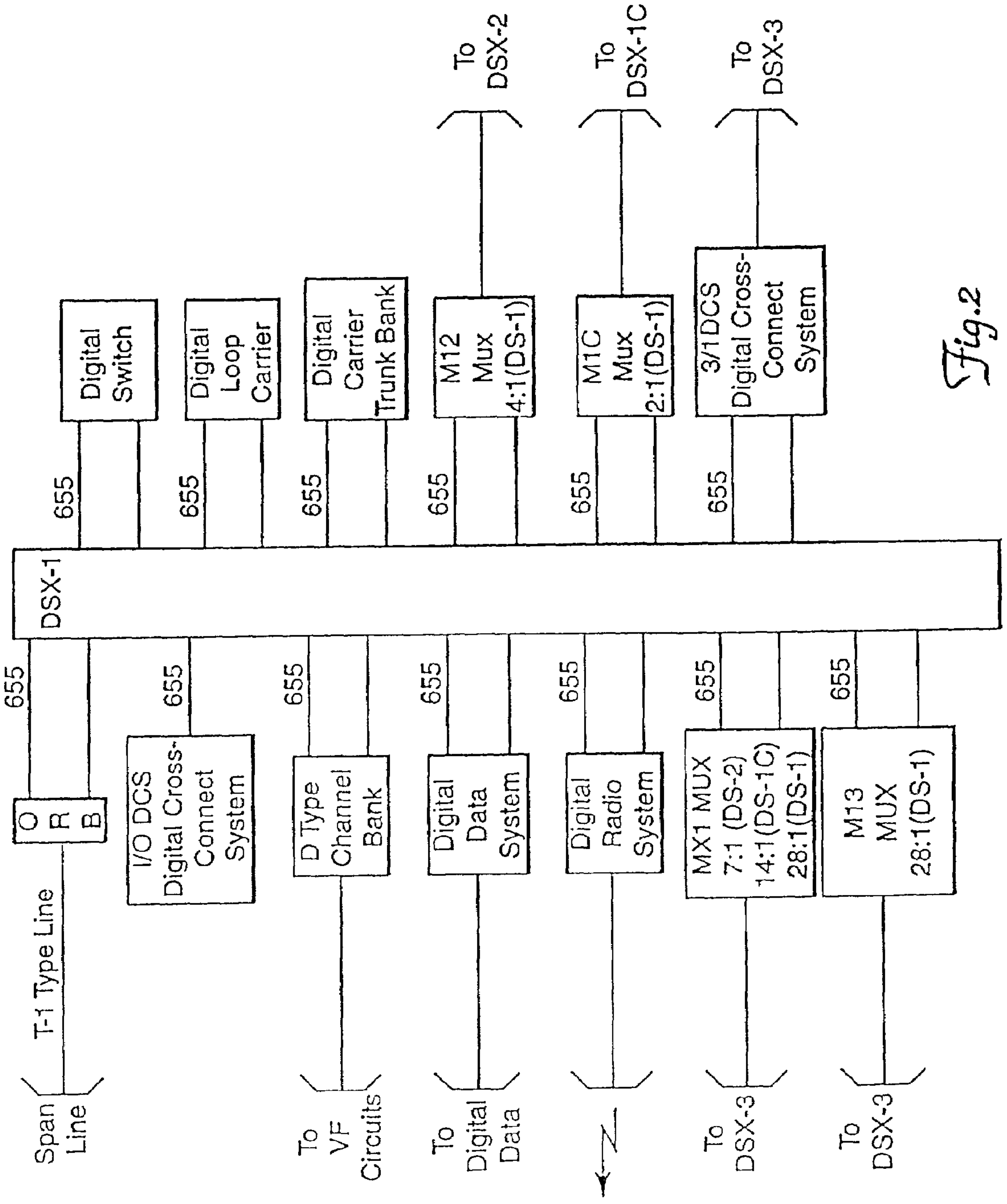
FIG. 2 is a illustration of a cross-connect apparatus which is typically used when cross-connecting a variety of digital communications equipment.

FIG. 2 illustrates an exemplary configuration of a digital cross-connect (DSX) system of a type suitable for employment in an intelligent cross-connect system of the present invention. The cross-connect system shown in FIG. 2 is typically used as an interconnection point between outside plant facilities and telecommunications equipment for accommodating high-speed digital connections having data rates on the order of 1 Mbps to 50 Mbps. It is important to note that a typical digital cross-connect system contains only passive connections which are extremely reliable, such that no active electronics interfere with the information signals passing through the cross-connect system. Those skilled in the art appreciate that stringent reliability requirements established by information service providers severely limit and typically preclude the use of active electronics within the information signal circuit path, which significantly increases the difficulty of effectively and efficiently determining the identity of all connections established within a cross-connect system.

The cross-connect system shown in FIG. 2 provides a termination point for permanently connected equipment, and also accommodates a series of connection jacks, termed bantam jacks in the industry, whereby patch cords may be employed to temporarily redirect connections. By having all equipment and facilities terminate on a cross-connect system, a service provider is able to manually patch around trouble spots, or rearrange equipment and facilities without service interruption. The particular embodiment shown in FIG. 2 illustrates a DSX-1 system designed to terminate DS1 (1.544 Mbps) circuits, and also accommodates other data rates such as E1 (2.048 Mbps) or DS3 signals (44.736 Mbps) associated with DSX-3 systems.

Figure 3:
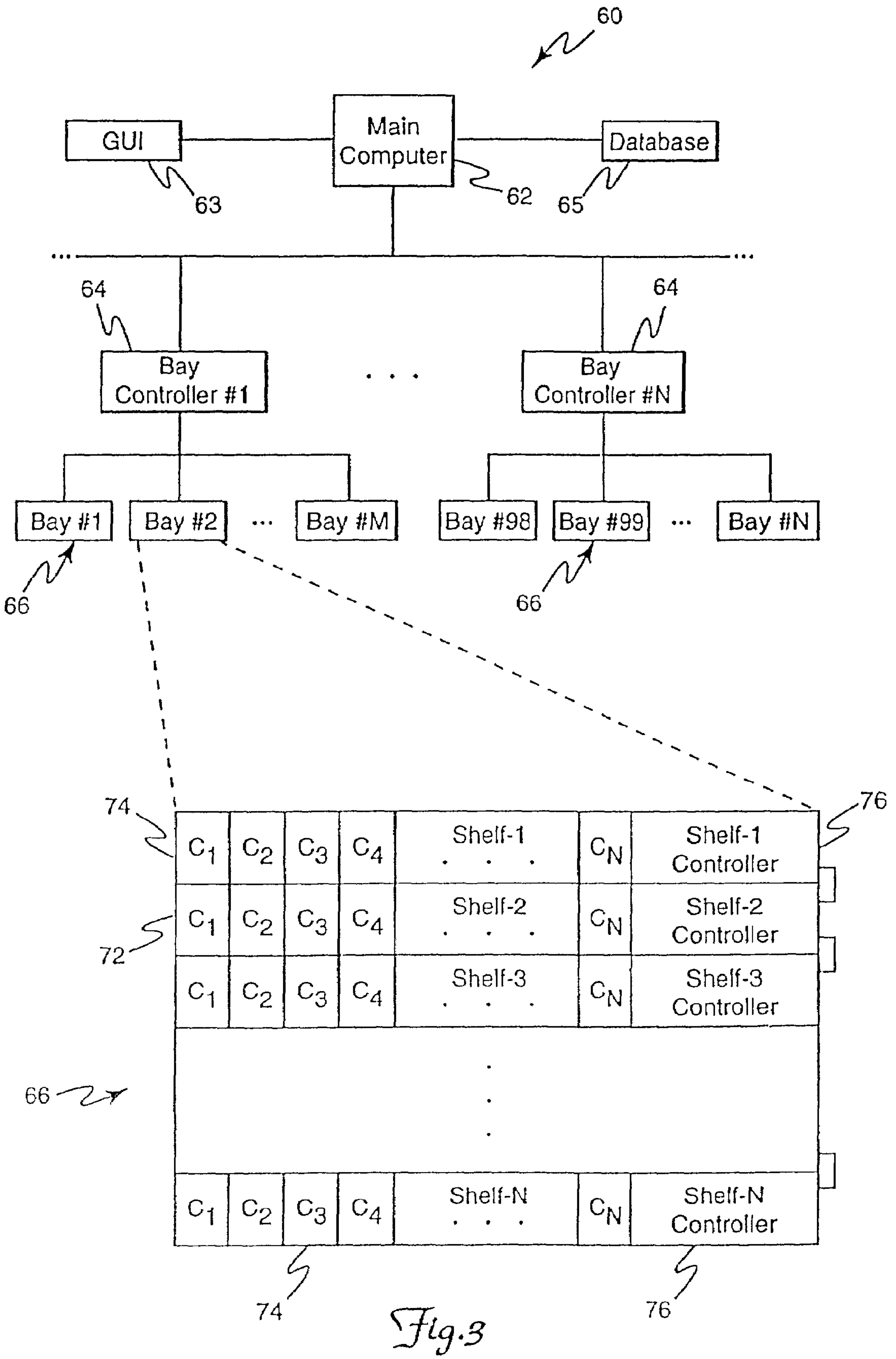
FIG. 3 is a depiction of an intelligent cross-connect system which operates in accordance with the principles of the present invention.

In FIG. 3, there is illustrated an embodiment of a cross-connect system which operates in accordance with the principles of the present invention. In accordance with this embodiment, a central office 60 is typically organized in a hierarchical fashion, and includes a number of bays or frames 66, each of which houses several shelves 72 of cross-connect circuits 74. A specified number of individual cross-connect circuits 74 are removably installed in each of the shelves 72. A shelf controller 76, also removably housed in each of the shelves 72, communicates with each of the cross-connect circuits 74 installed within the shelf 72.

Figure 4:
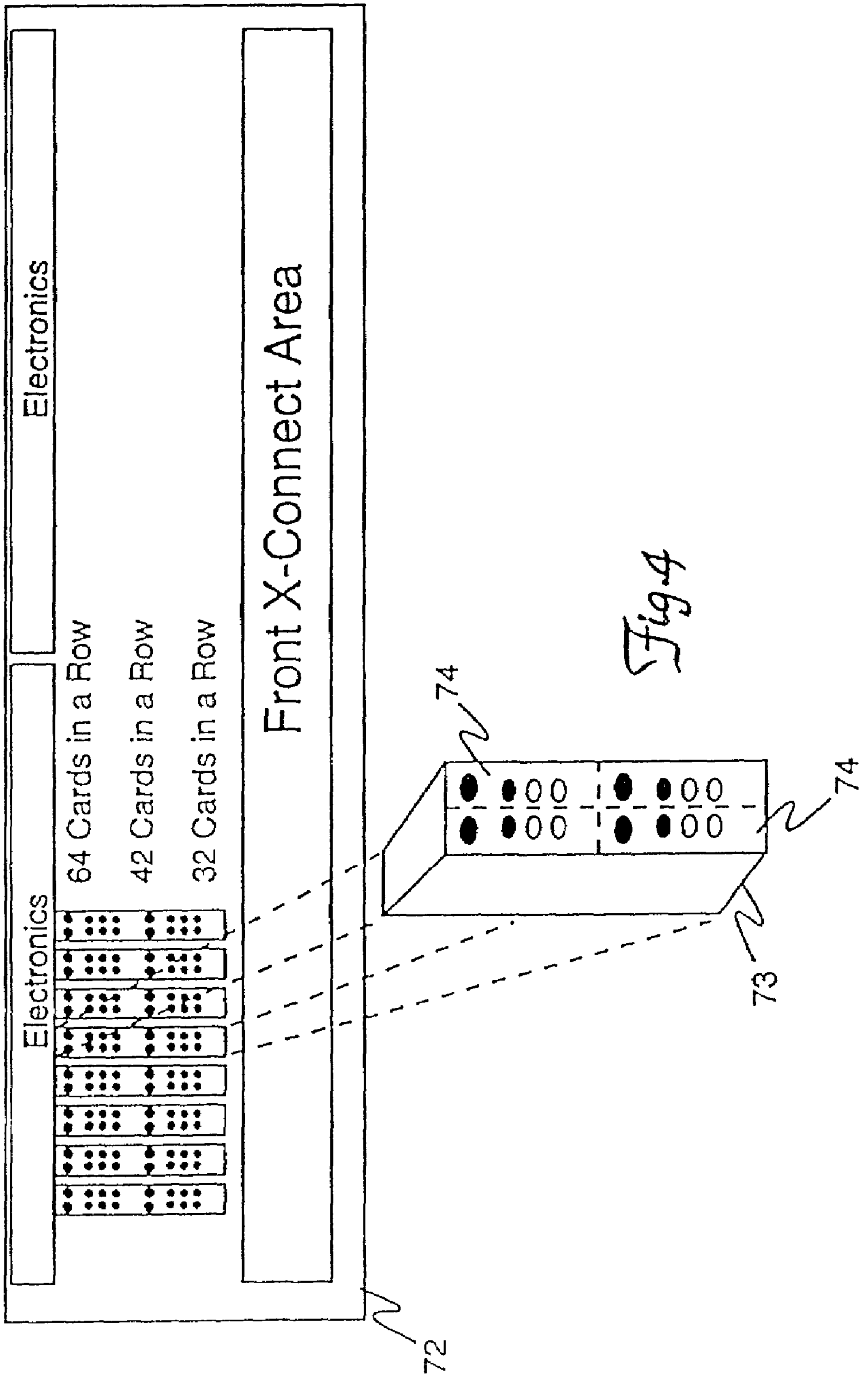
FIG. 4 is a perspective view of a cross-connect shelf within which a number of cross-connect circuits and a shelf controller are installed.

An embodiment of a shelf 72 within which a number of individual cross-connect circuits 74 and a shelf controller 76 are removably installed is illustrated in FIG. 4. A number of individual cross-connect circuits 74 may also be grouped to form packs 73 of circuits 74, such as four circuits 74 being grouped to form a modular "quad" card 73. The shelf 72 includes a printed circuit board (PCB) backplane which provides for the communication of information and power signals between the circuits 74 and controller 76, and provides connectivity with other circuits 74, shelf controllers 76, and components of the cross-connect system 60.

Each of the shelf controllers 76 communicates with a bay controller 64 which, in turn, communicates with a main computer 62, such as a central office computer. In one embodiment, the bay controller 64 cooperates with the main computer 62 to coordinate the activities of the shelf controllers 76 installed in one or more of the bays 66. A bay controller 64 may, for example, service up to 32 bays 66 of cross-connect equipment. In an alternative configuration, each shelf controller 76 may communicate directly with the main computer 62. The main computer 62 may be employed as a central information and control resource for a number of bay controllers 64 maintained at a central office 60. It is understood that the bays 66 of cross-connect equipment constituting a central office may be situated at a single location, such as a building, or distributed at a number of geographically separated locations.

Connection information is acquired from individual shelf controllers 76 and communicated to the main computer 62, where it is stored in a cross-connect database 65. A graphical user interface (GUI) 63 is employed by a user to access the database 65. It is understood that the main computer 62 may constitute a single computer platform or a distributed platform connected via a network or other communications infrastructure. The database 65 may constitute a single non-volatile memory device or a distributed memory device.

A cross-connect system operating in accordance with the principles of the present invention advantageously exploits TRACE wire connections as a communications conduit for implementing various connection sensing, identification, and monitoring functions. It is understood in the industry that TRACE wire or lamp wire is used in a conventional DSX system to connect the TRACE LEDs of each of the cross-connected circuits for purposes of manually tracing a connection. The cross-connect system of the present invention utilizes TRACE wire and patch cord connections to effectively form scanning busses over which scanning signals are transmitted in accordance with a unique scanning methodology.

As will be discussed in greater detail, this unconventional use of TRACE wire and patch cord connections within a cross-connect system, in combination with the scanning protocol described hereinbelow, provides for the continuous and near real-time acquisition of connection status information which is maintained and updated in a centralized cross-connect database. It is noted that the term "scanning bus" as used within the context of the embodiments disclosed herein refers to either one or both of TRACE wire and patch cord connections. In a general context, a scanning bus is intended to refer to any connection, whether electrical, optical or otherwise, within a cross-connect system other than a connection intended to be used exclusively for communicating information signals.

Figure 5:
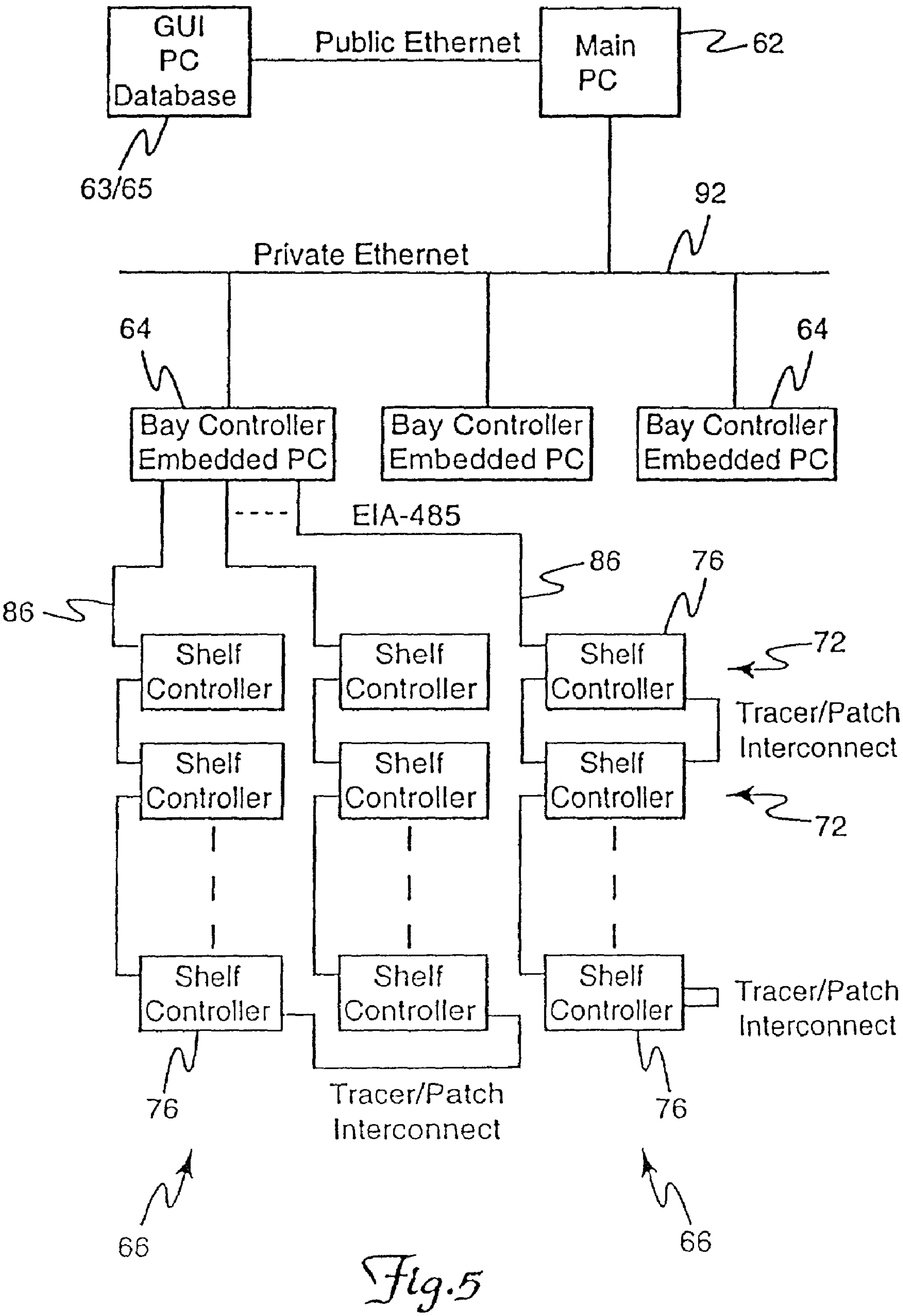
FIG. 5 illustrates an embodiment of a scanning bus topology and system architecture which is used to communicate scanning signal information in accordance with a scanning methodology of the present invention.

In the embodiment shown in FIG. 5, a scanning bus or network is illustrated which is used to communicate connection and other information between cross-connect circuits, shelf controllers, and a main computer of the intelligent cross-connect system. In this configuration, the scanning bus includes a network connection 86 over which shelf controllers 76 of a particular bay or bays 66 communicate with each other. The network connection 86 may constitute an EIA-485 serial communication connection, which is understood to be a four-conductor, multi-drop, full-duplex balanced signal serial bus connection.

For purposes of illustration, and not of limitation, it is assumed that a central office of a telecommunications service provider includes one-hundred bays 66 of cross-connect equipment. Each bay 66 includes thirteen shelves 72, with each shelf 72 housing eighty-four individual cross-connect circuits 74. The shelf controllers 76 installed in respective shelves 72 of each bay 66 communicate with a bay controller 64 and with a main 62 over a private ethernet connection 92. As such, each bay controller 64 may be viewed as constituting a node of the central office scanning network.

The central office or main computer 62 accumulates connection information acquired by each of the shelf controllers 76 to develop cross-connection records for the entire central office. Each of the bay controllers 64 cooperates with their respective shelf controllers 76 to determine all hard-wired and patch connections established at the central office, to detect changes to the various connections, and to update a cross-connect database 65 accessed by the main computer 62 on a near real-time basis, such that any connection changes are automatically reflected in the continuously updated database. Through the use of a graphical user interface 63, a service provider is able to query and display cross-connect records 65 for any circuit within the system.

A hard-wired connection may be established between a pair of circuits housed within the same bay, such as circuits 3 and 2 of shelves 12 and 2, respectively, of bay 1, or between circuits housed within the same bay and shelf. A hard-wired connection may also be established between circuits housed in different bays, such as between circuit 3 of shelf 1, bay 1, and circuit 84 of shelf 13, bay 99. Further, patch cord connections may be established between circuit pairs of a common bay or of different bays, such as between circuits 84 of shelf 1 for bays 1 and 2, respectively. It is noted that a bridging repeater may be employed within the scanning bus configuration for effecting scanning operations between cross-connect circuits of distantly located bays.

In one embodiment, a bay controller 64 is embodied as a single board computer or PC motherboard running an appropriate communications protocol to effect transmission between the private ethernet 92 and the shelf controllers 76. The ethernet protocol may be an ASN.1 compliant simple network management protocol (SNMP) running on top of TCP/IP. Data rates ranging between approximately 10 Mbps and 100 Mbps are obtainable using this arrangement. A bay controller 64 communicates with a number of shelf controllers 76 using an EIA-485 bus protocol, in which the bay controller 64 operates as a single master which polls the shelf controllers 76. The shelf controllers 76 transmit information only when polled by the bay controller 64.

In further discussing this embodiment, each shelf 72 is assigned a unique 48 bit ID number. During an initial system configuration phase, the bay controller 64 retrieves the 48 bit ID of all shelves 72 connected thereto. The bay controller 64 then assigns each shelf an 11 bit ID number which will be used in subsequent communications.

Arbitration on the EIA-485 connection is facilitated by operating in a four wire, full-duplex mode; two for transmit, and two for receive. If there is more than one new device on a particular EIA-485 bus, as may occur at initial power-up, an arbitration scheme using the 48-bit shelf ID is employed to resolve collisions. It is noted that in an embodiment of a shelf controller that utilizes a universal asynchronous receiver/transmitter (UART), the UART is byte oriented and generally must complete the current byte transmission before reacting to a collision.

When a collision on an EIA-485 connection occurs, each node initially uses the least significant bit of the shelf ID to resolve the collision. When a new device poll event occurs and bus inactivity has been verified, each node attempts to respond to the new device poll. If a collision occurs, the nodes stop transmitting. If the shelf ID bit of a node implicated in the collision is zero, this node responds again immediately. The next most significant bit of the shelf ID for this node is then pointed to for arbitrating subsequent collisions. Otherwise, the node awaits the next new device poll event.

Most, if not all, SNMP commands and responses between the main computer 62, through which the cross-connect database 65 is accessed, and the bay controllers 64 are generic queries and responses conforming to the Management Information Base (MIB) format. The MIB is an industry standard data format which provides for the network management of a device. Within its device-specific structure, the MIB data contains all of the information about the bay controller 64 and all of the associated shelf controllers 76 and alarm collection shelves, as well as any future devices that are connected to it. A request from the bay controller 64 typically indicates the element of the MIB data of interest, and the response is generally the same message with appropriate value(s) added. When an event occurs, the bay controller 64 initiates an SNMP trap. The main computer 62 then responds in an appropriate manner so that the bay controller 64 is informed that the message was received.

Figure 6:
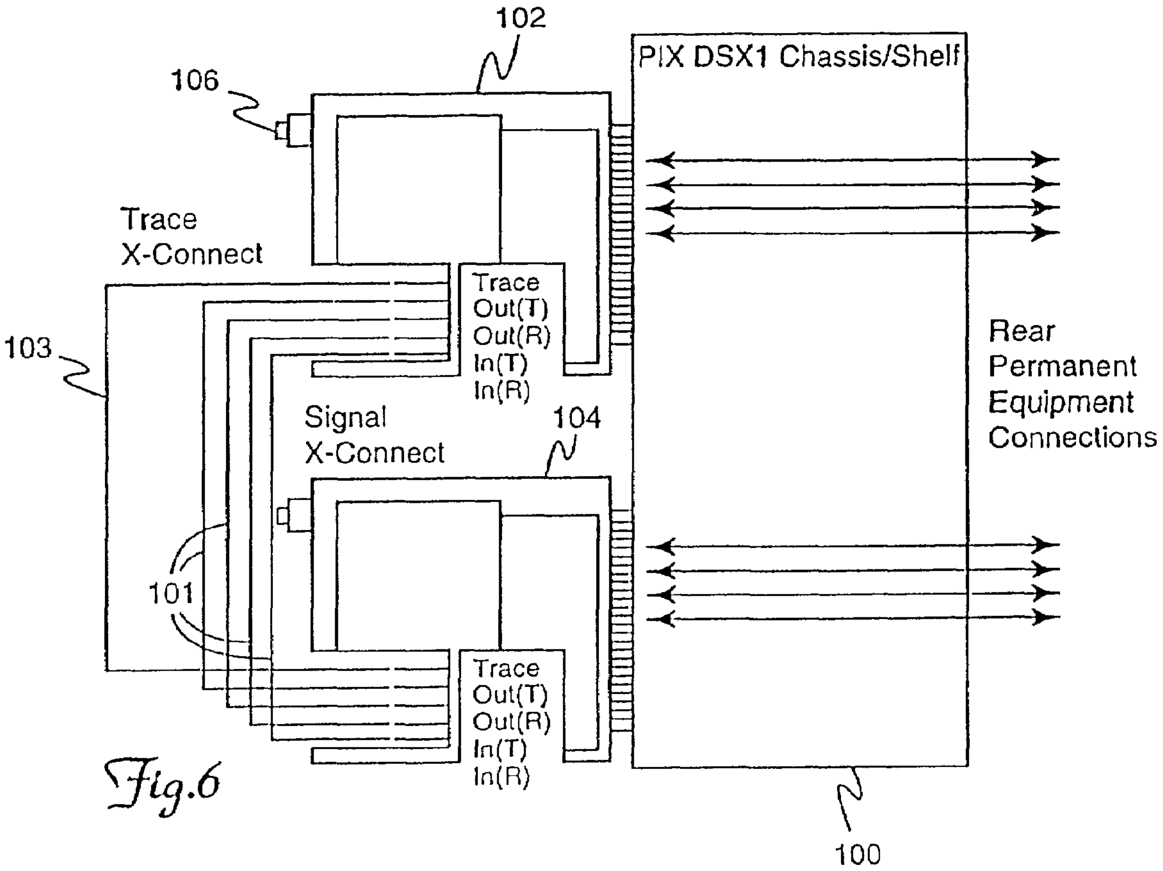
FIG. 6 is an illustration of a pair of cross- connect circuits which communicate information signal information there between over a standard multi-conductor connection, and further communicate scanning signal information over a trace connection.
Figure 7:
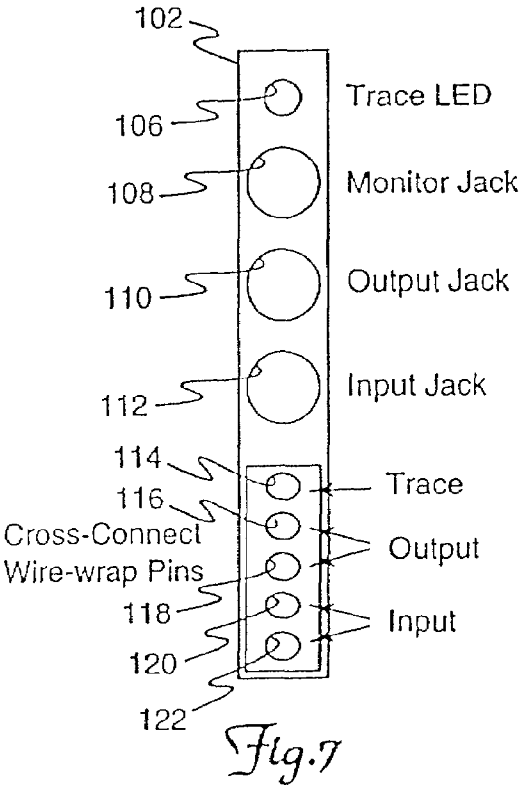
FIG. 7 is a front view illustration of the circuit shown in FIG. 6 which includes a number of jacks, LEDs, and wire-wrap pins.

Referring now to FIGS. 6 and 7, there is illustrated a pair of connected cross-connect circuits 102, 104 in accordance with one embodiment of the present invention. In this configuration, each cross-connect circuit 102, 104 plugs into a shelf or chassis 100. Permanent equipment connections are terminated on the rear of the shelf 100. The permanent connections established on the rear of the shelf 100 are effectively passed through the cross-connect circuits 102, 104 to the front of the circuits 102, 104. Each piece of equipment may be cross-connected to other equipment components typically by installing a five-conductor jumper cable to terminals extending from the front of circuits 102, 104.

The five-conductor cable is an industry standard cable that is used by a variety of cross-connect equipment suppliers. The five conductors support a transmit and receive pair, plus an additional TRACE conductor. In a DSX-1 configuration, this five-conductor cable constitutes a twisted pair cable that is "wire-wrapped" to appropriate terminal posts provided on the circuits 102, 104. In the case of a DSX-3 system, cross-connections are established using two coaxial jumpers for transmit and receive, along with a third jumper that connects the TRACE line contacts. In a fiber optic cross-connect system, a separate electrical conductor is typically used as the TRACE conductor. Alternatively, connection information in the form of optical signals may be communicated along a separate fiber optic TRACE connection.

When used in a conventional manner, the TRACE or "TL" connection provides a means of manually tracing the connection between cross-connected circuits, such as circuits 102, 104 shown in FIG. 6. By activating the TRACE on one circuit, such as circuit 102, through use of a switch or jack operation, the TRACE line is grounded, which causes TRACE LEDs 106 of the respective circuits 102, 104 to illuminate. Illumination of the TRACE LEDs 106 of a cross-connected circuit pair permits manual tracing of the circuits and identification of the cross-connected circuit locations within the central office.

FIG. 7 is a front view depiction of the circuits 102, 104 shown in FIG. 6, and illustrates an embodiment in which a singe TRACE LED 106 is employed. The cross-connect circuit embodied in the schematic illustration of FIG. 8 includes two TRACE LEDs 106, namely, a red and a green LED 106. The front panel of a cross-connect circuit may additionally include a two digit, seven segment display with incrementing momentary pushbuttons for the two digits and a clear momentary pushbutton, all of which is controlled with firmware. Various types of status and instructional information may be displayed to a technician through use of the circuit display. It is noted that firmware residing in a memory provided in a cross-connect circuit, shelf controller, or bay controller may be installed and updated by implementing an appropriate firmware downloading procedure.

It is well appreciated by those skilled in the art that the task of accurately identifying the location and status of all cross-connected circuits within a central office, and updating connection records on a regular basis, represents a significant challenge to the service provider. A telecommunications service provider, for example, may manage over one hundred bays of cross-connect equipment maintained at a single location, with many such installations established in various cities. By way of further example, a single central office location which houses one hundred bays containing thirteen shelves within which eighty-four cross-connect circuits are installed provides for a total of 109,200 connections established at this single location.

Maintaining accurate connection records for hundreds of thousands of connections has proven to be impractical, if not impossible, using conventional manual tracing approaches. The cross-connect monitoring system of the present invention provides for accurate and continuous electronic monitoring and updating of connection records for any number of connections.

Figure 8:
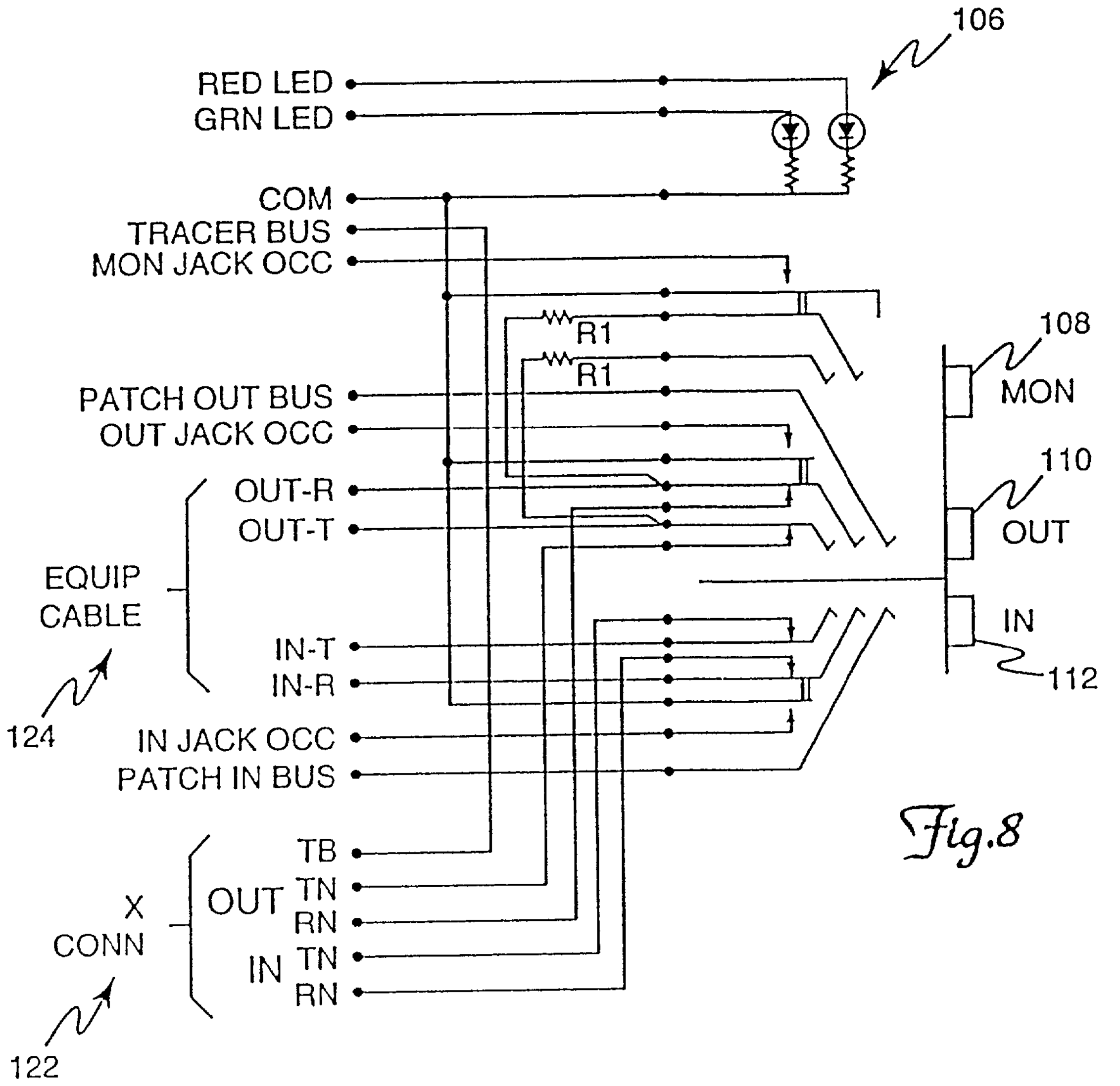
FIG. 8 is schematic illustration of one embodiment of the circuit shown in FIG. 6.
Figure 9:
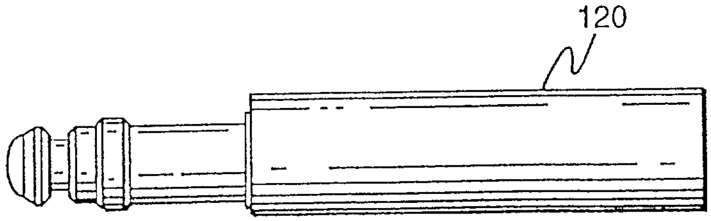
FIG. 9 is an illustration of a standard bantam plug over which scanning signal information is communicated by use of the shielding sleeve conductor of the bantam plug.

FIG. 8 is a schematic representation of the MONITOR, OUTPUT, and INPUT bantam jacks 108, 110, 112 and ancillary circuits shown in FIG. 7. A partial showing of a typical bantam plug 120, which is connected to each of the opposing ends of a patch cord, is shown in FIG. 9. The normal function of a patch cord when used within a cross-connect system is to temporarily re-direct a circuit connection to a termination point different from that established by the circuit's hard-wired connection.

As can be seen in FIG. 8, when a bantam plug 120 of a patch cord is inserted into either the OUTPUT jack 110 or INPUT jack 112 of a cross-connect circuit 102, the circuit connection to the hard-wired connection is broken, such that a new conductivity path is established over the patch cord. The bantam plug 120 connected at the opposing end of the patch cord may then be inserted into an appropriate OUTPUT or INPUT jack 110, 112 of another cross-connect circuit 104, thereby establishing a new and generally temporary cross-connection through the patch cord.

A conventional bantam plug 120 used in the industry for establishing patch connections typically includes three conductors which are identified in telephony terms as TIP, RING, and SLEEVE (i.e. SHIELD). The TIP and RING conductors are used to transmit information signals, while the SLEEVE or SHIELD is used as an interference protection mechanism (e.g., ground shield). As can be seen in FIG. 8, when a bantam plug 120 is inserted into either the OUT or IN jack 110, 112, the respective OUT or IN signal will redirected over the patch cord, and the connection to the TN/RN wired cross-connect 122 will be broken. It is noted that the TL, TR, and RN signal contacts 122 represent hard-wired (e.g., wire-wrapped) connections, and the IN/OUT R, T connections 124 represent the rear permanent connections.

Figure 10:
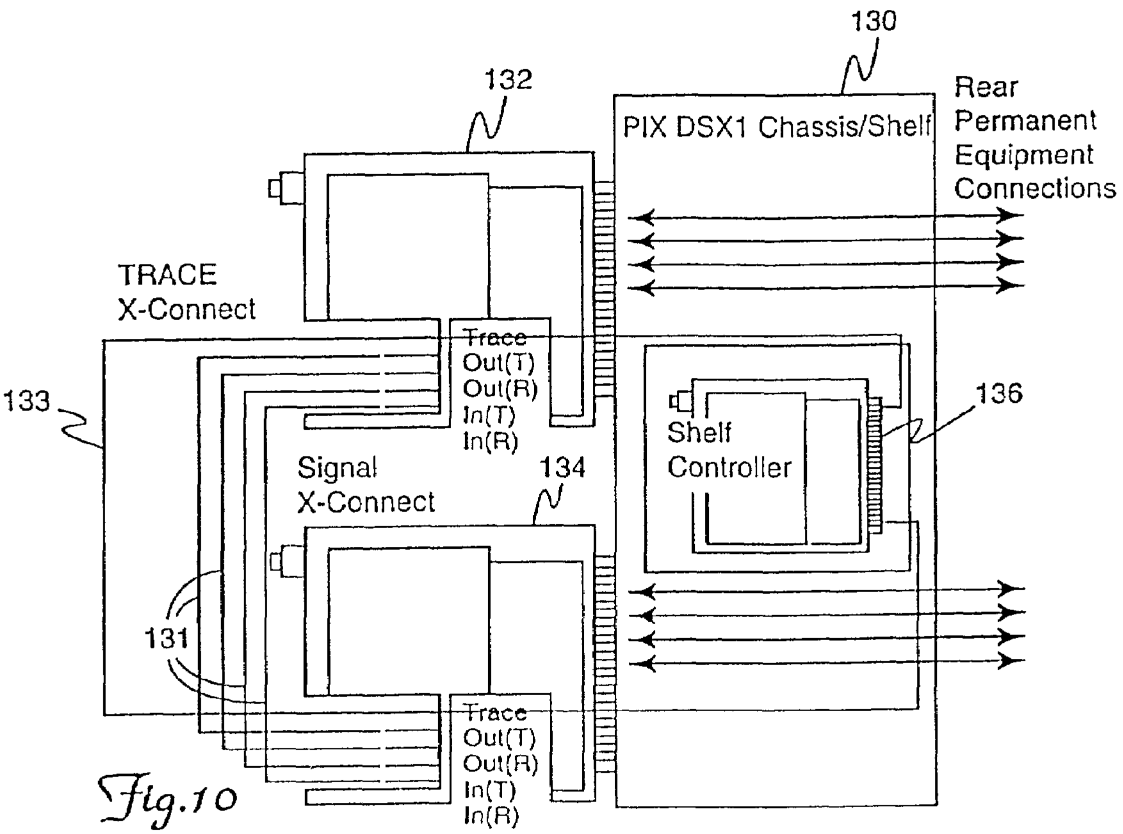
FIG. 10 is an illustration of a cross-connect shelf which includes a shelf controller that communicates with a pair of connected cross-connect circuits to effectuate a scanning procedure utilizing the trace connection in accordance with the principles of the present invention.
Figure 12:
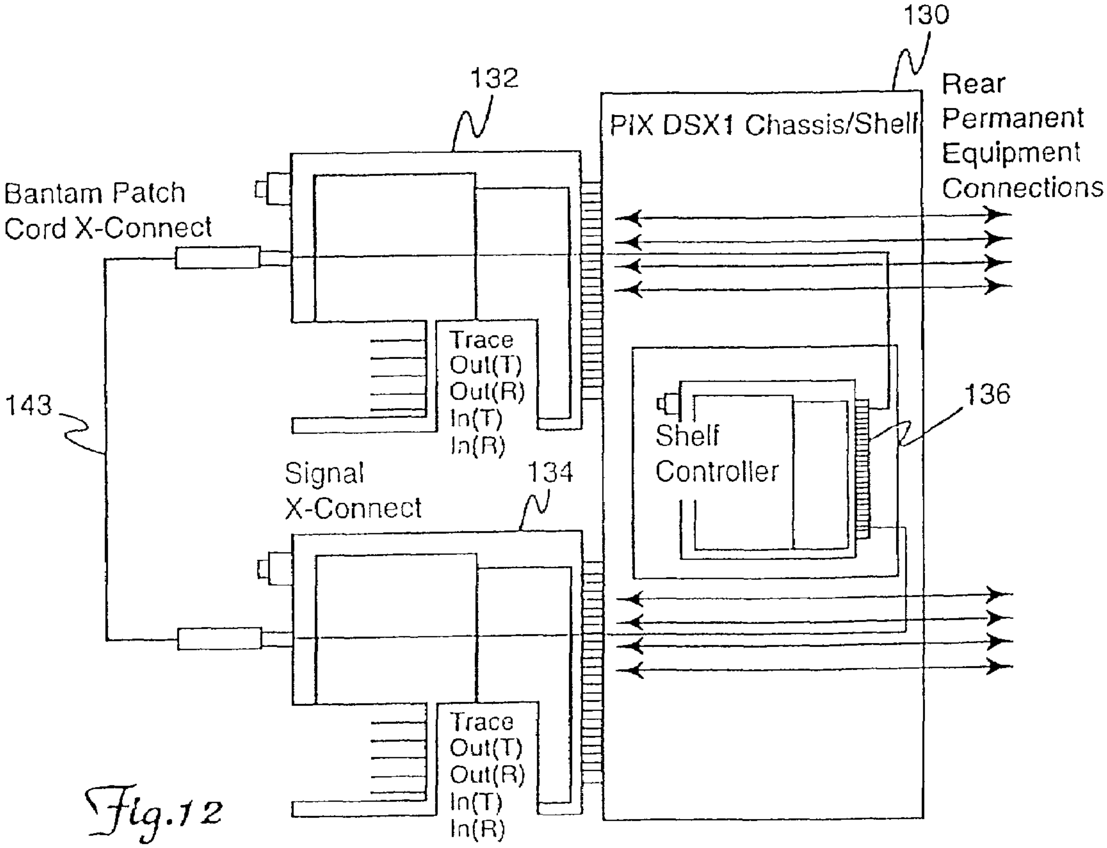
FIG. 12 illustrates an embodiment of a shelf controller which communicates a scanning signal through the shielding sleeve of a patch cord connecting a pair of connected cross-connect circuits for the purpose of determining the identity of the connected circuits.
Figure 11:
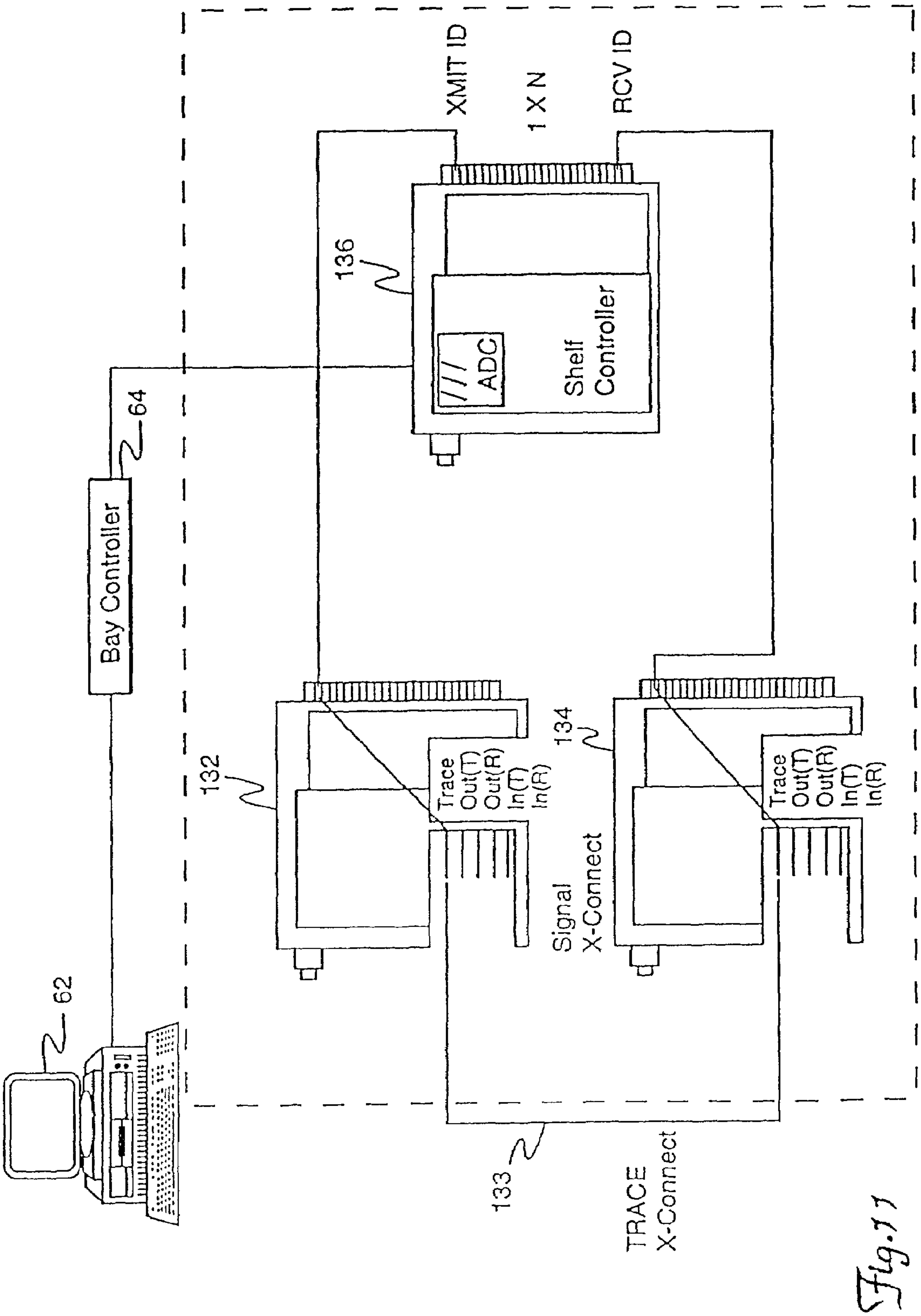
FIG. 11 is a system level illustration of a scanning apparatus in which cross-connect circuit identification information is acquired by a shelf controller and communicated to a main computer for storage in a cross-connect database.

Referring now to FIGS. 10-12, there is depicted an embodiment of various circuit elements which are used in an intelligent digital cross-connect system to electronically and automatically identify and monitor all connections established through the circuits of the cross-connect system on a continuous basis. In accordance with this embodiment, and as discussed briefly hereinabove, the TRACE wire conductor 133 is utilized in an unconventional manner, in that a scanning signal is communicated through the TRACE wire conductor 133 in accordance with a unique cross-connect scanning methodology.

In broad and general terms, a shelf controller 136 generates a scanning signal, which includes location identification information associated with a transmitting cross-connect circuit 132, and transmits the scanning signal across the TRACE wire conductor 133 of the transmitting circuit 132. The scanning signal communicated by the transmitting cross-connect circuit 132 is received by a receiving cross-connect circuit 134. Having received that scanning signal at the circuit 134, the shelf controller 136 associated with the receiving circuit 134 reports the transmitting and receiving circuit location identification information to a main computer, such as the bay controller 64 or main computer 62 shown in FIG. 3. It is understood that the receiving circuit 134 may be located in the same shelf 130 as the transmitting circuit 132, a different shelf 130 within the same bay, or a shelf of a bay distantly located from that housing the transmitting circuit 132.

The shelf controller 136 dedicates an individual connection for each TRACE connection of individual cross-connect circuits installed in a particular shelf 130. Each shelf controller 136 transmits circuit location identification information, typically by use of a digital scanning signal, across each of its TRACE wire connections either in a particular sequence or in parallel depending on the particular scanning algorithm employed. By transmitting a location identification signal on one port and receiving a location information signal on another port, the shelf controllers 136 of a cross-connect system collectively identify the location of all circuits established through the cross-connect system. Unused circuits are also identified. All shelf controllers 136 in all equipment bays proceed through this general scanning operation in order to identify all of their respective connections. Each shelf controller 136 will then report its connection information to a main computer 64 via a data connection.

Concerning the circuit configuration shown in FIG. 12, and as briefly discussed hereinabove, a patch cord 143 may be employed to temporarily re-direct information signals between cross-connect circuits other than those connected through use of a hard-wired connection. When the bantam plug of a patch cord in sensed in either the IN or OUT jack 112, 110, a scanning signal produced by the shelf controller 136 is transmitted over the SLEEVE or SHIELD conductor of the patch cord 143 to a newly selected receiving cross-select circuit 134. Information identifying the location of the transmitting circuit 132 is encoded in the scanning signal and used together with information identifying the selected receiving circuit 134 to identify the newly established patch connection. This information is similarly communicated to a central computer.

Using the SLEEVE or SHIELD conductor of the patch cord 143 advantageously provides a conduit for communicating scanning signal information without requiring additional patch cord conductors. It is understood that modifying the configuration of an industry standard patch cable so as to include an additional conductor would result in increased costs and the potential of making obsolete hundreds of thousands of cross-connect patch cables currently in use. Because the transmission speed of the scanning data is relatively low, no appreciable interference problems arise with the use of the shield conductor of the patch cord 143.

Figure 13:
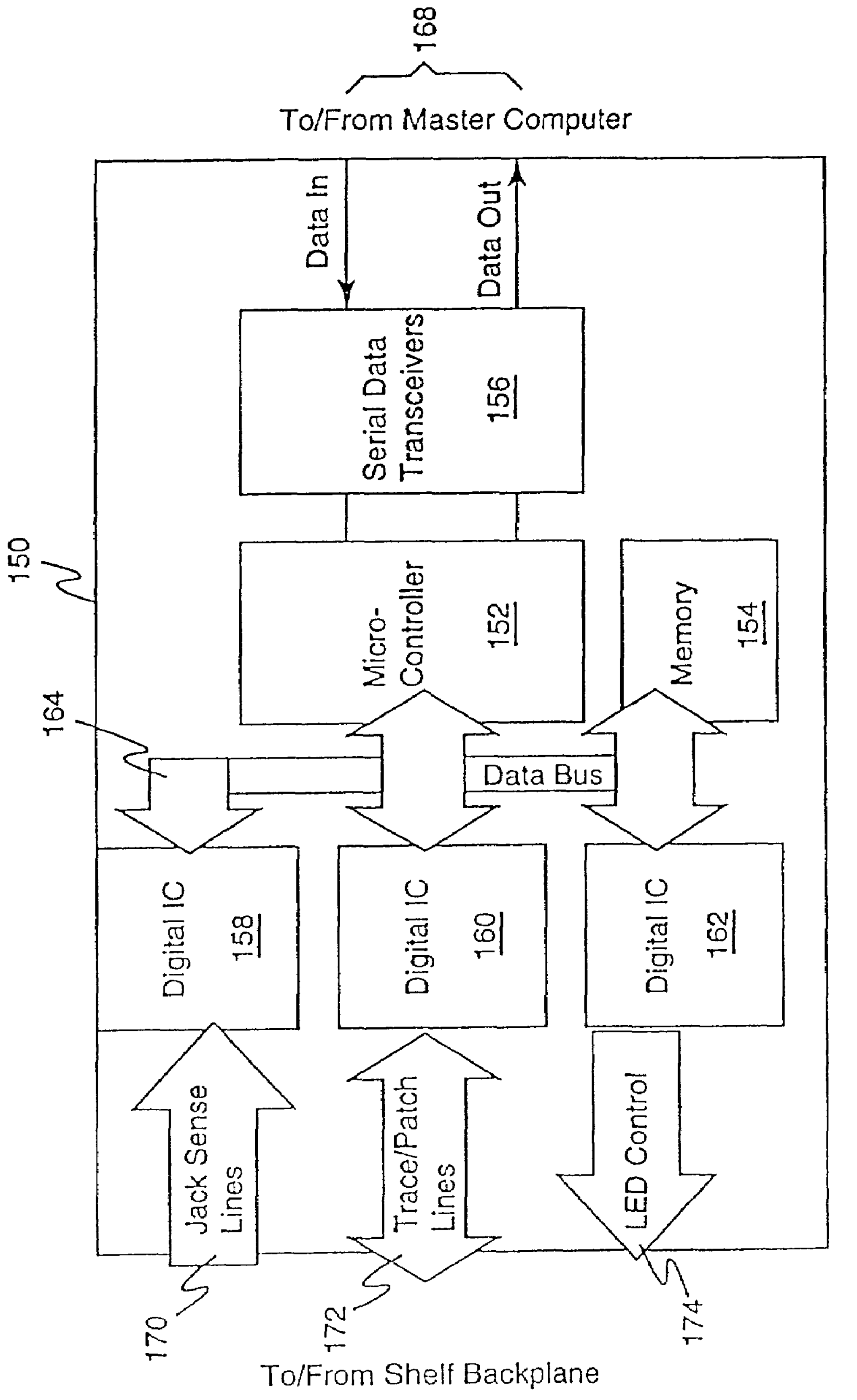
FIG. 13 is a system block diagram depicting the various components constituting one embodiment of a shelf controller.

A generalized system block diagram of a shelf controller 150 is depicted in FIG. 13. In accordance with this embodiment, the shelf controller 150 includes a micro-controller 152 which communicates with a memory 154 and various digital devices 158, 160, 162 over a data bus 164. The general function of the digital interface circuits 158, 160, 162 is to receive or transmit data from a large number of input/output sources and, when requested, present this data to the micro-controller's data bus 164. The micro-controller 152 then stores all of the connection and status information into the memory 154, and when requested, transmits this information over the serial data bus 168 to the main computer. The micro-controller 152 communicates with an ancillary processor, such as a bay controller 64, through serial data transceiver circuits 156.

A digital interface circuit 158, which is coupled to a number of jack sense lines, receives signals indicating the presence or absence of a bantam plug in any one of the MONITOR jack 108, the OUTPUT jack 110, or the INPUT jack 112. A digital interface device 162 communicates with a TRACE LED 106 and controls the illumination, flashing, color selection, and other operations of the TRACE LED 106. Using the jack sense lines to sense the presence of a bantam plug in the MONITOR jack 108, the shelf controller 150 may activate the TRACE LEDs 106 for a pair of connected circuits so as to simulate a "trace" as would otherwise occur within a conventional cross-connect systems.

In general, the scanning signal transmitted through a TRACE connection or patch connection provides location identification and status information regarding the transmitting cross-connect circuit. In Table 1 below, there is provided various types of information that may be encoded in a scanning signal in accordance with one embodiment of the present invention.

TABLE 1

| SCANNING SIGNAL INFORMATION | NO. OF BITS |
|---|---|
| Shelf Number | 11 or more bits |
| Circuit Number | 7 or more bits |
| Path Number | 2 bits |
| Command | 8 bits |
| Checksum | 8 or more bits |
| Synchronizing Bits (Start/Stop) | 2/8 bits |

In one embodiment, the identification of the shelf number and cross-connect circuit number are encoded using eleven and seven bits, respectively, irrespective of whether the scanning signal is transmitted over a TRACE wire connection or patch connection. The Path Number field indicates the transmission path as being either the TRACE, Patch IN, or Patch OUT connection. It is to be understood that the scanning signal fields provided in Table 1 represents a non-exhaustive list of information variables which may be encoded in a scanning signal. Other information different from or in addition to that included in Table 1 may also be encoded in the scanning signal.

Each of the shelf controllers maintains a local database of identification and status information concerning the cross-connect circuits with which it communicates. Table 2 below provides an example of various types of information which may be maintained and updated in the local database of a shelf controller.

TABLE 2

| LOCAL DATABASE INFORMATION | NO. OF BITS |
|---|---|
| Full Shelf Number | 48 bits |
| Abbreviated Shelf Number | 11 bits |
| Circuit Parameters: | (Number of bits × Number of circuits) |
| TRACE (hard-wired) Circuit ID | |
| Circuit Number | 7 bits |
| Path Number | 2 bits |
| Patch (temporary) Circuit ID | |
| Circuit Number | 7 bits |
| Path Number | 2 bits |
| MONITOR Jack Occupied | 1 bit |
| Patch IN Jack Occupied | 1 bit |
| Patch OUT Jack Occupied | 1 bit |
| LED State | 4 bits |
| Red LED OK | 1 bit |
| Green LED OK | 1 bit |
| Circuit Pack Present | 1 bit |

The four LED bits provide for four LED states, including OFF for both Red and Green LEDS. Combining these states provides the opportunity to use yellow or orange, depending on the current limiting resistors chosen. The LEDs may change state every eighth of a second allowing for a variety of LED presentations to be implemented.

As was discussed previously, the scanning signals which are received by a receiving cross-connect circuit are communicated to a main computer and preferably stored in a database containing cross-connect information. An exemplary set of database fields for such a database is provided below in Table 3. In general, the cross-connect database provides for the storage and access of a comprehensive set of information concerning each and every cross-connection established through a central office.

In accordance with one embodiment, the database includes fields generally corresponding to those associated with the information provided in Tables 1 and 2 above, as well as other information of interest, such as the central office location, name, floor, and location of a particular bay, connection history, and user or administrator comments, for example.

TABLE 3

| DATABASE FIELDS | DESCRIPTION |
|---|---|
| City | Name of the City |
| Central Office | Name of the Central Office/Exchange |
| Floor | Floor Location of the Cross-Connect Bay |
| Bay No/Name | Bay/Frame Name |
| Shelf No. | Shelf Number |
| Circuit No. | Circuit Number or Port within Shelf |
| CLLI Name | Common Language Location Identifier |
| Circuit Type | Identifies whether Circuit Port is a "Facility Side", or "Network Side" Port |
| Circuit Description | Free-Format Description Field for the Customer |
| Connection Status | Identifies whether the Port is Connected or not Connected |
| Connection History | Provides a History of Connection Status Information - Including Time/Date Stamp, Circuits Connections and Disconnections |
| Comments | Free-Format Comment Field with USER ID, Date/Time Stamp |
| Cross-Connect Information | Fields of Detailed Connection Information |

One of several functions performed by the shelf controller 150 involves detecting a change in the condition of a patch cord, such as whether any patch cords have been installed into or removed from a particular jack of a particular cross-connect circuit. As can be best seen in FIG. 8, additional electrical contacts within each of the MONITOR, OUTPUT, and INPUT jacks 108, 110, 112 provide an indication to the shelf controller 150 as to the status of these jacks (i.e., bantam plug present or absent). All of the jack sense lines are connected via the backplane of a shelf chassis to the shelf controller 150. The micro-controller 152 periodically polls the status of each of the bantam jacks, stores the status information in the memory 154, and reports this information to the main computer when requested.

In general, when the main computer issues a command instructing a selected shelf controller to activate the TRACE LED of a particular circuit, the shelf controller causes the appropriate circuit LED to illuminate according to a pre-established flash pattern. It is noted that a flash pattern refers to a LED flash program that indicates various LED illumination parameters, such as steady and/or flash durations, flash speed, single or multiple colors usage, and other LED operating parameters. The TRACE LED will typically remain illuminated until the shelf controller receives an instruction from the main computer to turn off the TRACE LED or until such time as a flash pattern timer expires. The main computer may also initiate a command instructing a selected shelf controller to cause the TRACE LED of a particular circuit to flash. The shelf controller may store FLASH-ON and FLASH-OFF timing information, and will typically cause a TRACE LED to continue flashing at a specified rate until it is requested to terminate the flashing operation.

One particular function that is implemented through execution of the TRACE LED control and jack sense procedures, as mentioned previously, is the simulation of an industry-standard "trace" operation. Such an operation typically involves placing a bantam plug into the MONITOR jack of a particular circuit to initiate the trace. In a standard digital cross-connect system, this would result in grounding of the TRACE wire, thereby causing the TRACE LEDs at both ends of the circuit connection to illuminate.

In accordance with the present invention, however, insertion of the bantam plug in the MONITOR jack is sensed by the shelf controller 150 which, in response, transmits an LED flash command over the scanning bus. The LED flash command is decoded by the shelf controller associated with the receiving partner circuit which causes the LED(s) of the partner circuit to illuminate in accordance with a selected flash pattern.

Figure 14:
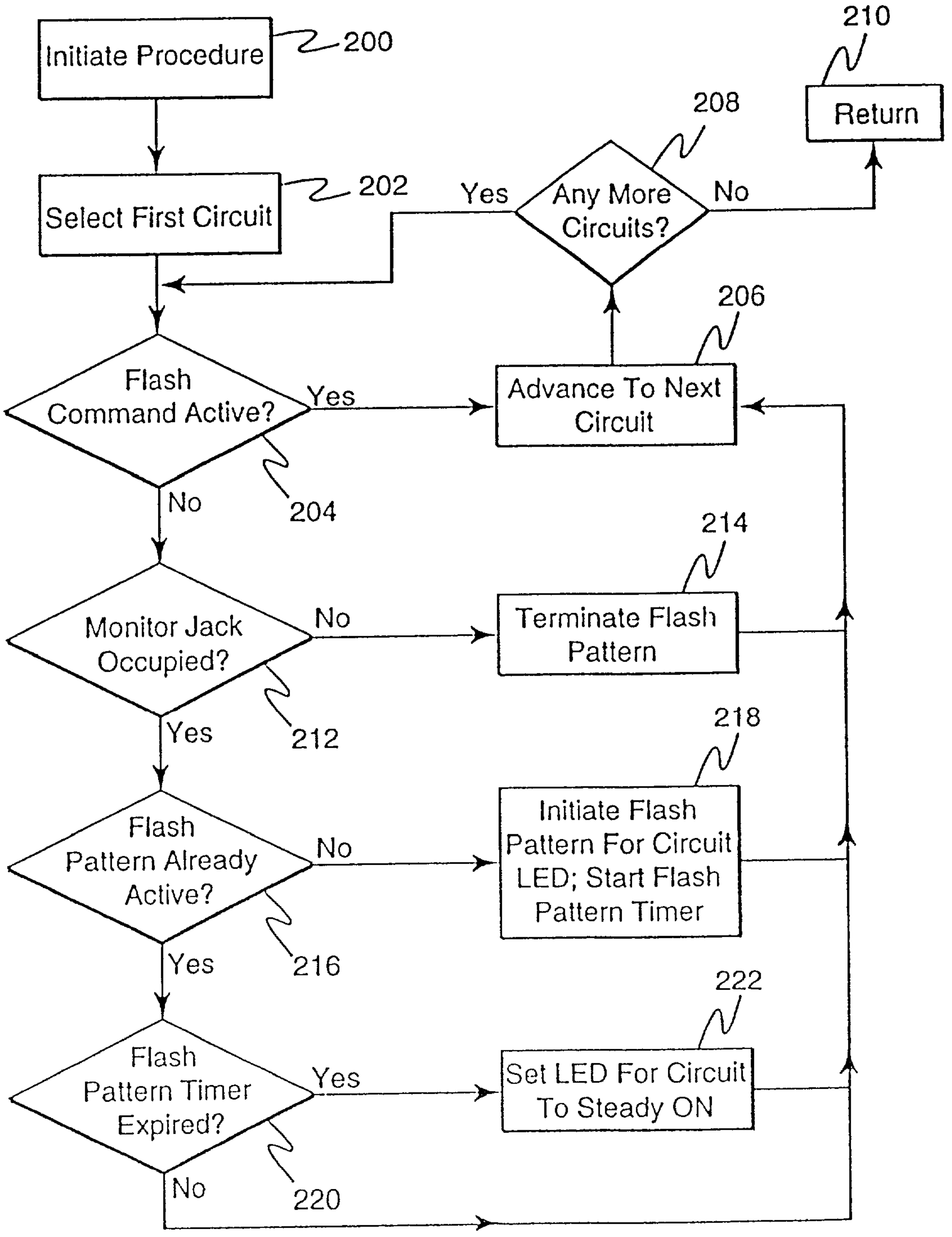
FIGS. 14-15 illustrate in flow diagram form various process steps associated with the control of single or multiple TRACE LEDs in accordance with an embodiment of a scanning methodology of the present invention.
Figure 15:
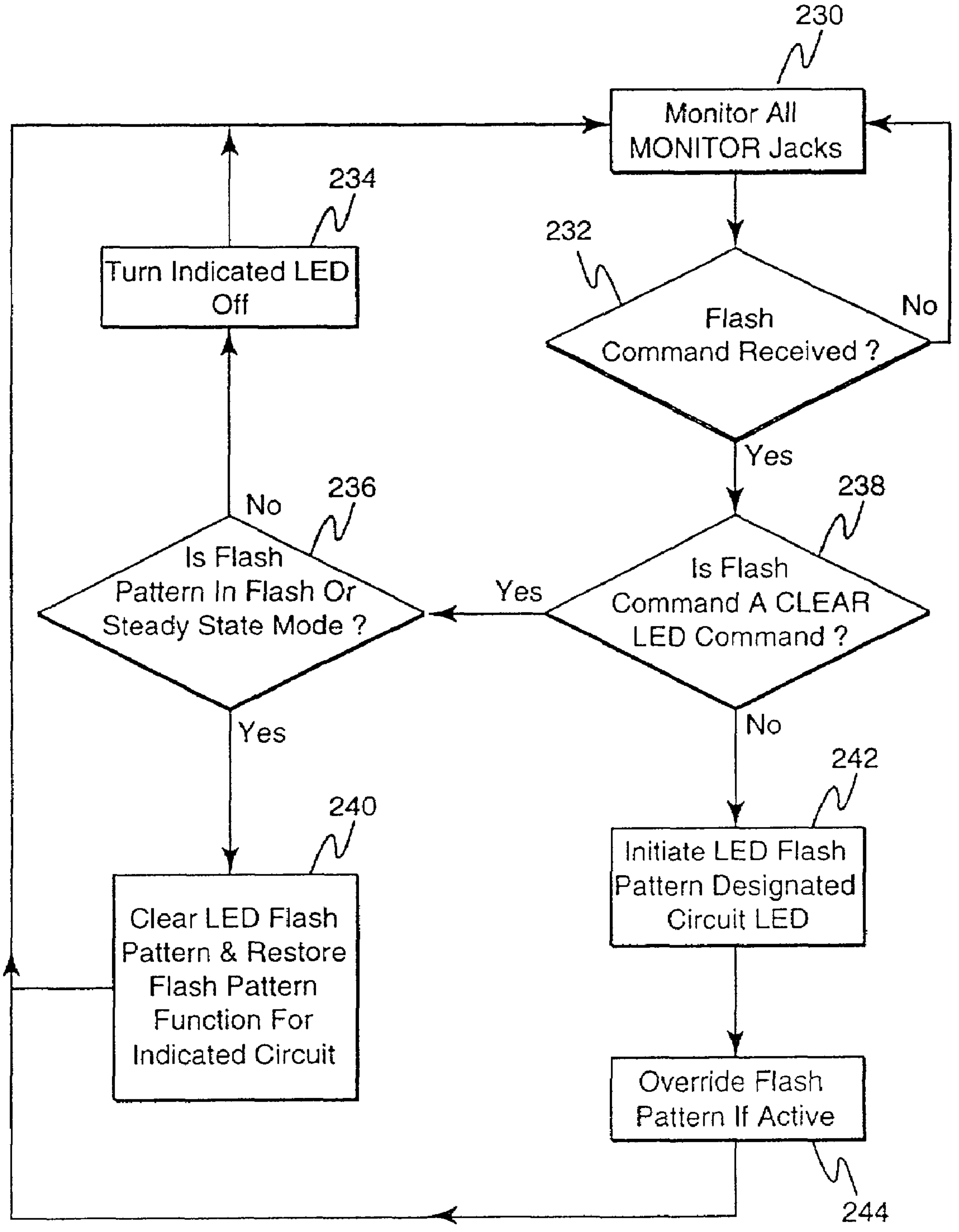

A more detailed description of various process steps associated with controlling the TRACE LEDs during a trace operation is shown in FIGS. 14 and 15. The shelf controller initiates 200 a TRACE simulation procedure by selecting 202 a first circuit installed within the shelf. If an LED flash command issued by the main computer has been previously transmitted 204 with respect to the selected circuit, the shelf controller detects this activity and selects 206 another cross-connect circuit in the shelf. If an LED flash command has not been issued, the shelf controller senses 212 the MONITOR jack of the selected circuit.

If a bantam plug is detected in the MONITOR jack, and if the flash pattern for the selected circuit is not currently active 216, the flash pattern function for the selected cross-connect circuit is initiated 218 and the flash pattern timer is turned on. If the MONITOR jack is occupied 212 and the flash pattern is already active 216, the TRACE LED 106 for the selected circuit is set 222 to a steady ON state if the flash pattern timer has expired 220. If the flash pattern timer has not expired 220, the shelf controller selects 206 another cross-connect circuit of the shelf.

If a flash command for the selected circuit is not active 204, and the MONITOR jack of the selected circuit is not occupied 212, the flash pattern operation is halted, and the shelf controller selects 206 another cross-connect circuit of the shelf. The TRACE simulation procedure continues until all of the cross-connect circuits of the shelf have been monitored 208, 210.

Additional TRACE LED control steps are depicted in FIG. 15. The shelf controller senses 230 the status of the MONITOR jack of all circuits with which it communicates. This monitoring process continues until such time as a FLASH command is received 232 from the main computer. If the command received 238 from the main computer is not a CLEAR LED instruction, then the shelf controller initiates 242 an LED flash procedure for the indicated cross-connect circuits with the indicated illumination pattern.

If active, the flash pattern is overridden 244 under this condition. If the flash command received 232 from the main computer is a CLEAR LED instruction 238, and if the locate flash pattern function is in a flash or steady on state 236, the LED flash is cleared and the flash pattern function is restored for the indicated cross-connect circuit. If the locate function is not in a flash or steady on state 236, then the LED is turned off 234.

It can be appreciated that the cooperative operation between the shelf controller and the main computer provides the opportunity to effect a full range of control over the TRACE LEDs for a variety of purposes. It is noted that one or more LEDs of a cross-connect circuit may be controlled by the shelf controller, and that the LEDs may be monochromatic or multi-chromatic in type. By way of example, cooperation between the shelf controller and main computer provides the ability to effectively guide a technician through various patch connection or disconnection operations.

In one embodiment, a "patch pending" file is created which indicates various connections or disconnections to be effected by a technician to accomplish a particular objective. The patch pending file, when executed by the main computer, may control multi-colored TRACE LEDs of specified circuits as a means of visually directing the work of a technician when establishing and breaking cross-connections. A flashing green LED indication, for example, may identify circuits in which a patch cord is to be inserted, while a flashing red LED indication may identify circuits in which an existing patch cord is to be removed.

A patch pending file typically contains information identifying the specific sequence by which patch cord installation or removal is to be accomplished by a technician. The main computer then steps a technician through each change, one circuit pair at a time. Since the main computer knows precisely when and where a patch cord is to be inserted or removed, the implicated LEDs may continue to flash until the technician effects a proper connection or disconnection for a particular circuit.

By way of further example, a patch pending file may be created which provides information concerning contingent or back-up connections that may be established in the event of a network outage. In a large communications network with critical circuits, for example, a patch pending file may identify important circuits which require immediate restoration during temporary or extended outages. When a system outage occurs within a typical central office, technicians typically use a shot-gun approach when attempting to identify all cross-connected circuits effected by the outage and the location of temporary patches that must be effected in order to restore important circuit connections. Creation of a patch pending file well in advance of an outage situation, provides an opportunity for the service provider to develop a well-considered strategy for dealing with any number of potential outage scenarios.

Upon occurrence of an actual system outage, an appropriate patch pending file may be selected and executed to implement an efficient, coordinated patching procedure for restoring key circuits. On-site technicians may then quickly proceed through the cross-connect system guided by the LED patch sequencing process in their effort to patch and unpatch specified circuit connections. It can be appreciated that use of patch pending files in this manner saves precious time in restoring important and other circuits impacted by an outage, which would otherwise be wasted on looking up records and sorting out needed connection information under stressful conditions associated with a major outage.

Referring now to FIGS. 16A-27, there is depicted various embodiments of a scanning methodology and apparatus by which all connections established through a cross-connect system or central office may be identified, and status information acquired and updated for all connections on a continuous basis. To facilitate an understanding of the various scanning approaches, reference is made to the circuit 600 depicted in FIG. 16A. The circuit 600 is typically incorporated as part of the shelf controller and may be embodied in a micro-controller, an Application Specific Integrated Circuit (ASIC) or Field Programmable Gate Array (FPGA), for example.

The circuit 600 includes a number of receive registers 602 and transmit registers 604 associated with each cross-connect circuit coupled to the shelf controller. In a shelf configuration in which 84 cross-connect circuits are housed, for example, the circuit 600 will include 84 receive register sets 608 and 84 transmit register sets 618, one receiver and transmit register set 608, 618 being respectively associated with each of the 84 cross-connect circuits.

The particular configuration of the circuit 600 may be varied to accommodate a variety of processing, speed, synchronization, and ASIC/FPGA floor planning (i.e., circuit layout) considerations. By way of example, each receive and transmit register set 608, 618 respectively includes a TRACE register 610, 620, a Patch IN register 612, 622, and a Patch OUT register 614, 624. In the embodiment illustrated in FIG. 16A, each of the TRACE, Patch IN, and Patch OUT registers constitutes a First-In-First-Out (FIFO) register or stack, it being understood that other buffering or memory implementations may be employed.

Figure 16A:
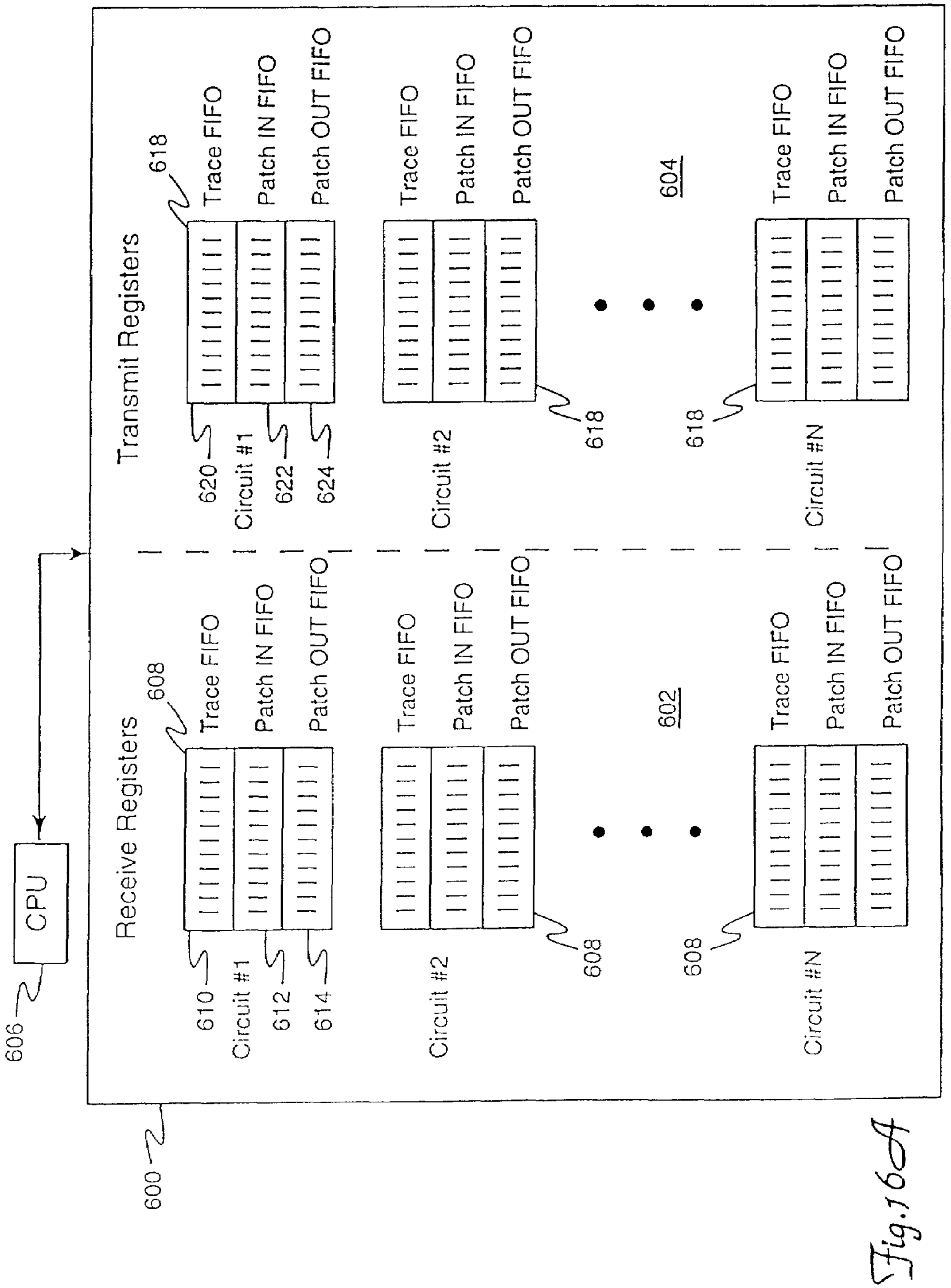
FIG. 16A illustrates one embodiment of a shelf controller circuit which includes a number of receive and transmit registers associated with each of a number of cross-connect circuits with which the shelf controller communicates.
Figure 16B:
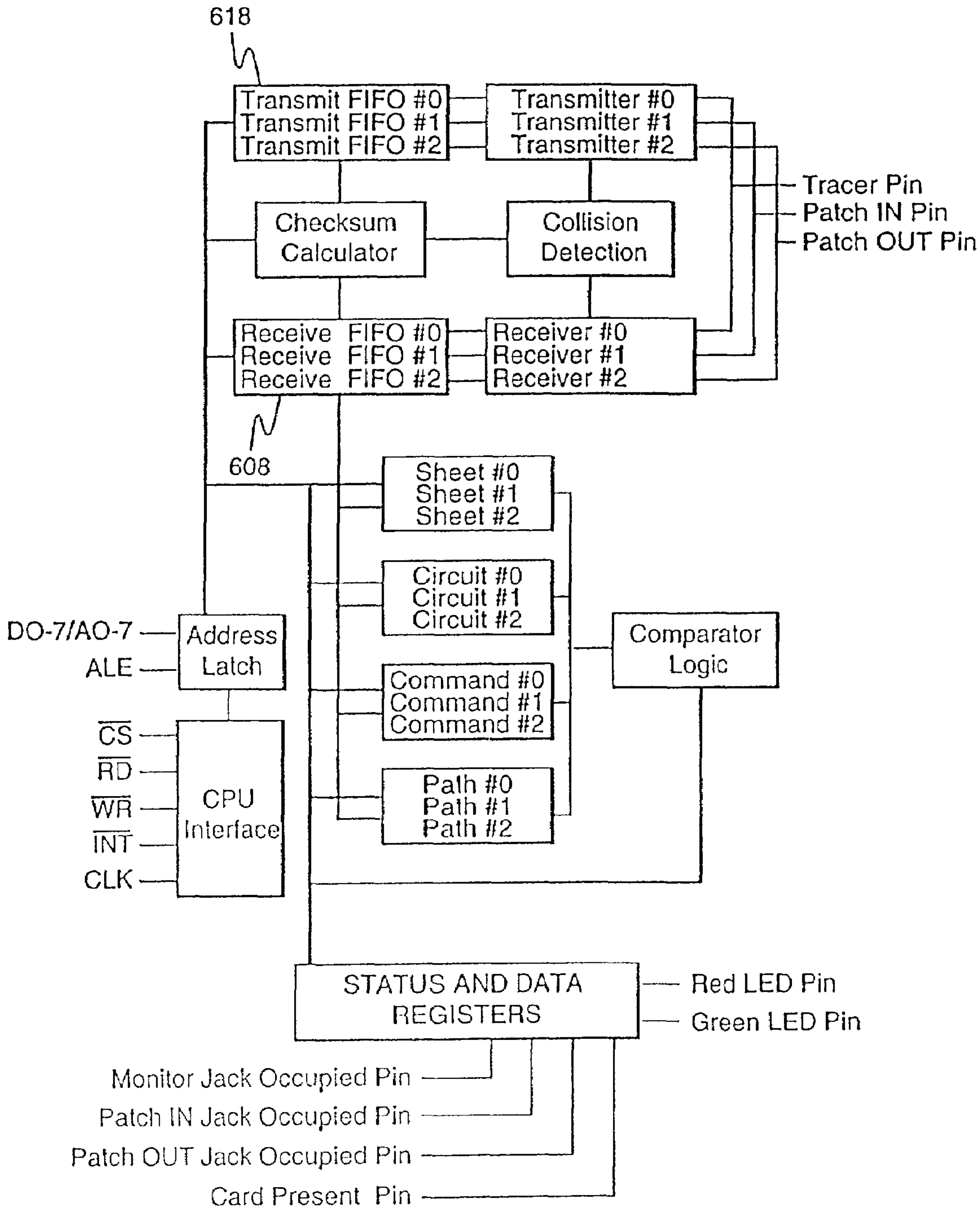
FIG. 16B illustrates in greater detail various receive and transmit registers and corresponding receiver and transmitter devices, in addition to other components, which are embodied in, and communicate with, the shelf controller circuit embodiment shown in FIG. 16A.

In one embodiment, the TRACE, Patch IN, and Patch OUT FIFOs 610, 612, 614 associated with the receive register 602 may each be coupled to a respective receiver circuit (not shown), and the TRACE, Patch IN, and Patch OUT FIFOs 620, 622, 624 associated with the transmit register 604 may each be coupled to a respective transmitter circuit (not shown). In this configuration, each cross-connect circuit is thus provided with three transmitters and three receivers. As such, data may be transmitted from and received by the three dedicated receive and transmit FIFO sets in a simultaneous or parallel manner. FIG. 16B is generally illustrative of this particular embodiment.

In an alternative embodiment, a single receiver may be multiplexed across the TRACE, Patch IN, and Patch OUT FIFOs 610, 612, 614 associated with each cross-connect circuit, and a single transmitter may be multiplexed across the TRACE, Patch IN, and Patch OUT FIFOs 620, 622, 624. Another alternative configuration, by way of further example, includes a single multiplexed transmitter and three dedicated receivers. It is appreciated that use of a multiplexed receiver or transmitter requires some form of sequential or selective circuit path switching amongst the associated receive or transmit FIFOs.

Figure 16C:
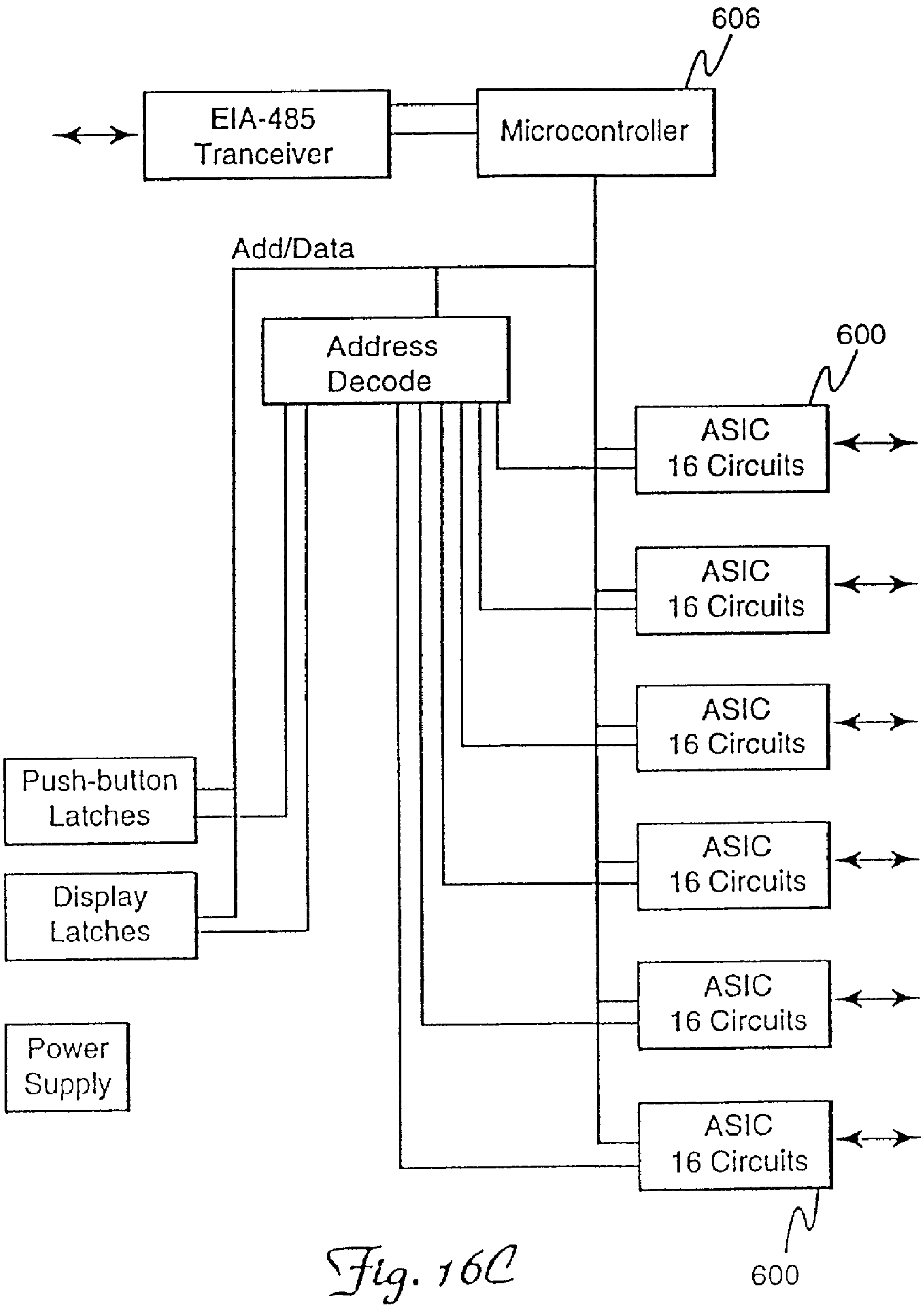
FIG. 16C illustrates a portion of the shelf controller shown generally in FIGS. 16A-16B embodied in one or more ASICs.

In accordance with a particular circuit 600 embodiment, as is illustrated in FIG. 16C, a single ASIC provides all of the logic required to support 16 cross-connect circuits. The number of cross-connect circuits supported in a particular shelf configuration may be expanded simply be installing additional ASICs. Each sub-circuit of an ASIC, such as Circuit #1 or Circuit #N shown in FIG. 16A, includes three physical pins respectively dedicated to the three circuit paths (i.e., TRACE, Patch IN, Patch OUT). Internally, the receive and transmit logic for each pin is functionally OR tied.

For purposes of increasing design flexibility and processing speed, the ASIC includes three transmitters and three receivers for each sub-circuit so as to provide for simultaneous data transmission and reception. The pins of the ASIC coupled to each cross-connect circuit include the following: TRACE Bus; Patch IN Bus; Patch OUT Bus; MONITOR Jack Occupied; IN Jack Occupied; OUT Jack Occupied; Red LED; Green LED; and Circuit Pack Present pins. It is noted that a Circuit Pack Present signal received at the Circuit Pack Present pin indicates the presence of particular grouping or pack of cross-connect circuits within the shelf. The ASIC also includes a number of standard pins, such as data bus, address bus, CLK, and other control signal pins.

A central processing unit (CPU) or micro-controller of the shelf controller cooperates with the circuit 600 to coordinate the operation of the receive and transmit register 602, 604. The receive and transmit FIFOs 602, 604 of a particular cross-connect circuit are employed to store data pertaining to the connection established between the particular circuit and the circuit connected thereto, and to effect the various scanning procedures implemented in accordance with the principles of the present invention.

In accordance with a general scanning methodology, each cross-connect circuit transmits its unique identification (ID) information or code to a partner circuit connected thereto. The partner circuit receiving the transmitting circuit's ID code stores this data and, when requested by the bay controller or main computer, transmits the transmitting circuit ID code and its own ID code to the main computer. Other connection status information may also be communicated between the transmitting and receiving circuits and transmitted to the main computer.

It can be appreciated that only the receiving circuits need transmit their respective connection information to the main computer in order to obtain the identification of all cross-connected circuit pairs within the system. It is important to note that the transmitting side generally does not know of the status of the receiving side. A transmitting circuit, therefore, will continue to transmit at regular intervals, thus providing a keep-alive signal to the receiving partner circuit. Moreover, after acquiring an initial set of connection information from all receiving circuits, only those receiving circuits containing new connection or disconnection information need pass the information to the bay controller or main computer.

In one embodiment, as will be discussed in detail hereinbelow, all circuit connections will be scanned and identified within the time it takes to transmit a single cross-connect circuit ID bit string, irrespective of the size of the cross-connect system (i.e., number of cross-connect circuits). If, for example, it is assumed that a given scanning methodology employs a circuit ID code of n bits in length, that start/stop and stuff bits constitute m bits, and that the clock speed is given as CLK Hertz, then the total scan time required to identify all circuit connections is given by:

$$(n+m)\cdot(1/CLK)$$

In stark contrast to conventional schemes in which the time required to identify all connections established within a cross-connect system increases as a function of increasing circuit population, the time required to identify all cross-connected circuits using the scanning approach depicted in FIGS. 17-23C is relatively short and constant (e.g., 100-500 milliseconds), regardless of whether the system contains ten thousand, one-hundred thousand, or even a million cross-connected circuits.

In the following discussion, reference will be made to a Transmit Table in connection with various procedures of a scanning operation. The circuit 600 depicted in FIG. 16A represents one conceptual embodiment of a Transmit Table, it being understood that other implementation may be employed in hardware and software to facilitate the scanning methodology. Initially, the Transmit Table is established in which circuit ID and patch status information is loaded for each of the circuits coupled to a respective shelf controller of the cross-connect system. The loading function, such as that depicted in FIGS. 17-18, takes into consideration all hard-wired connections between circuit pairs, and, importantly, all patch connections established using patch cords connected to the IN/OUT jacks of the circuits. As such, all physical cross-connections, whether hard-wired or patch connections, are identified.

Figure 17:
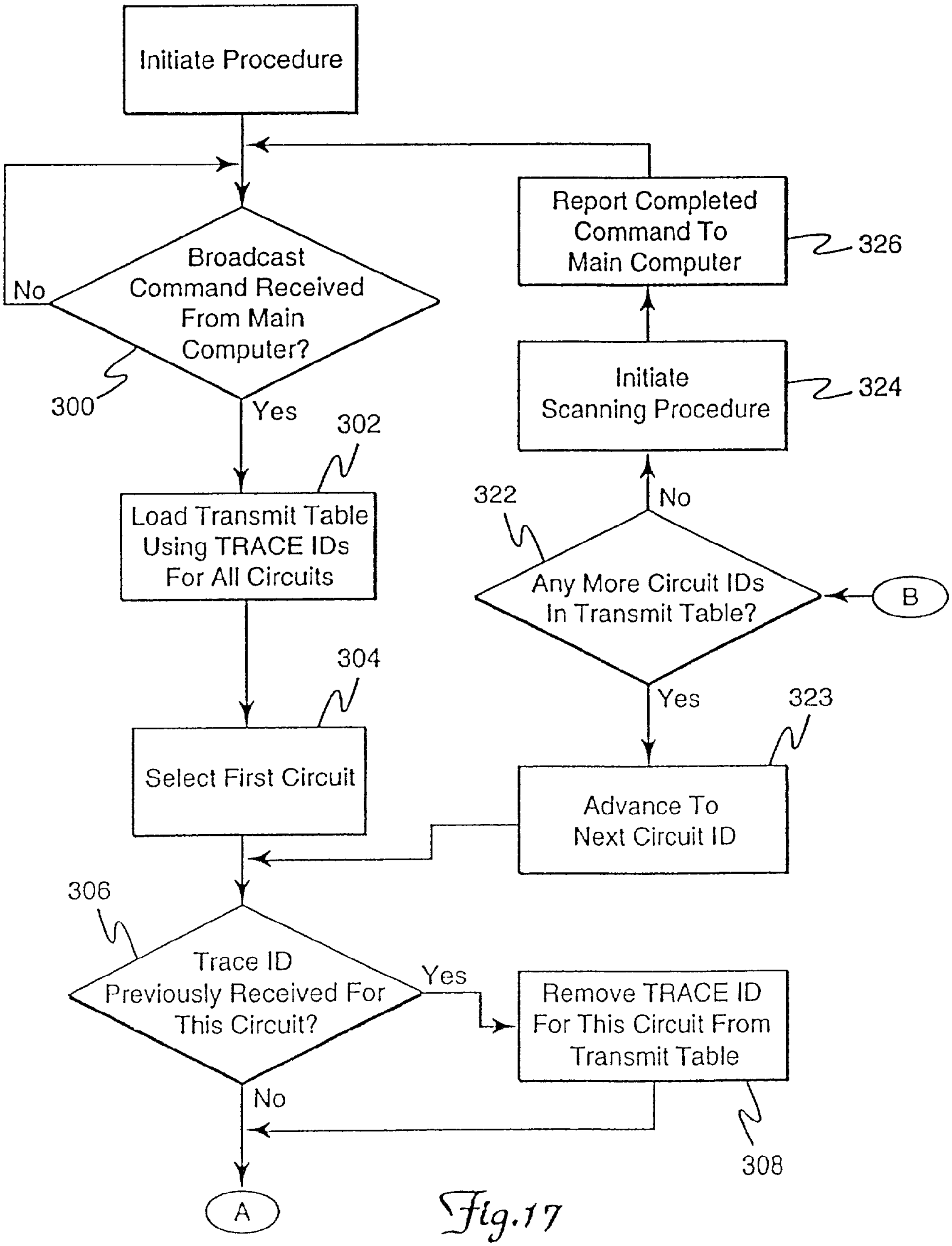
FIGS. 17-19 illustrate in flow diagram form various process steps associated with a scanning methodology in accordance with a first embodiment of the invention.
Figure 18:
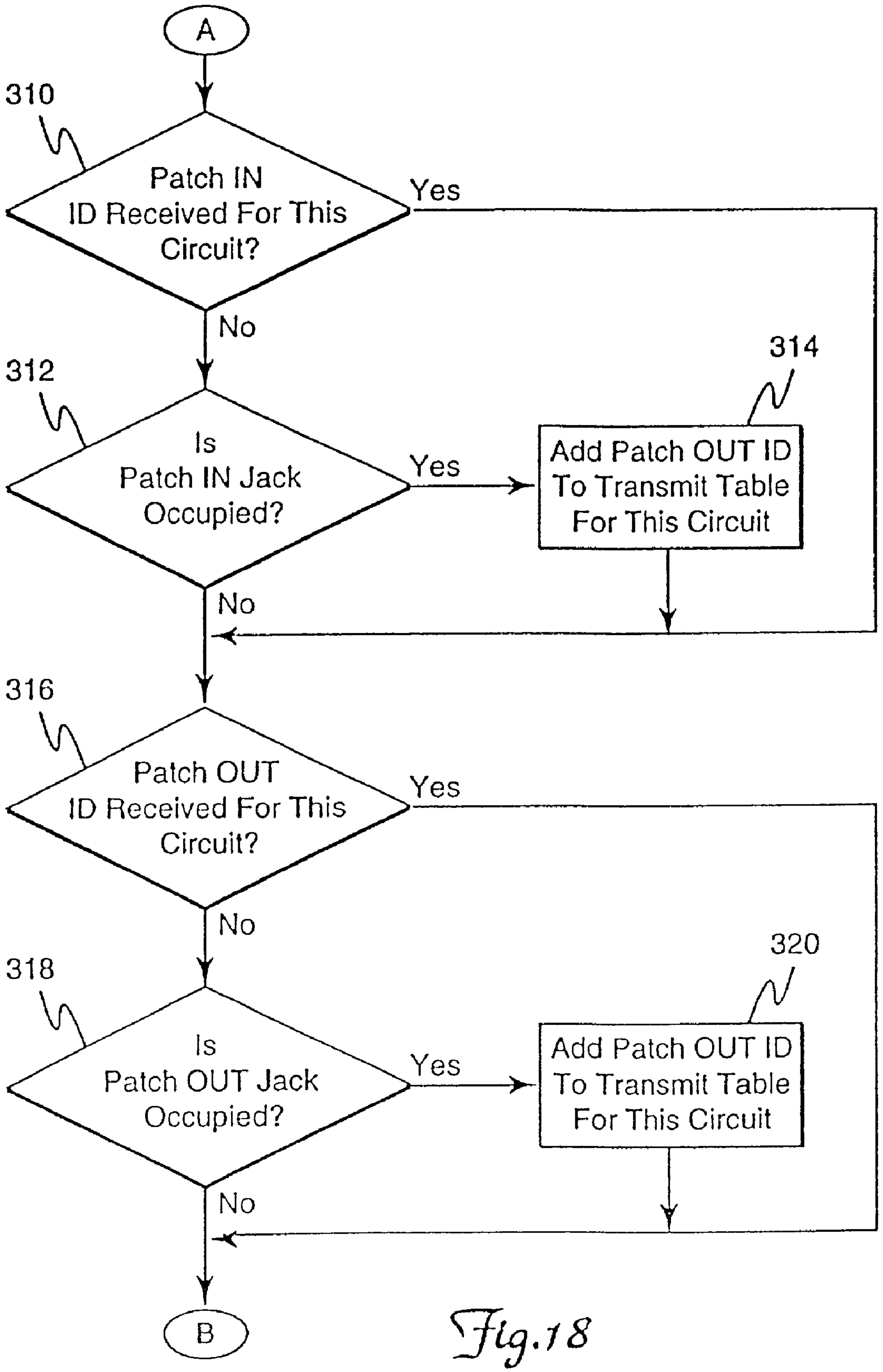

A typical Transmit Table loading operation is initiated upon receiving 300 a broadcast command issued from the main computer. After receiving the broadcast command, each of the transmit TRACE FIFOs 620 of each cross-connect circuit within a shelf is loaded with a TRACE identification code (TRACE ID). The TRACE ID represents a code which uniquely identifies the TRACE jack of a particular cross-connect circuit. In a similar manner, Patch IN and Patch OUT IDs represent codes which uniquely identify the Patch IN and Patch OUT jacks of a particular cross-connect circuit. The loading procedure illustrated in FIGS. 17-18 is implemented by each shelf controller for all bays of cross-connect equipment in a contemporaneous, parallel manner.

In addition to loading TRACE ID information into respective transmit FIFOs, the shelf controller scans 304 each of the circuit receive register 602 to determine 306 if a circuit ID currently resides in the circuit's receive TRACE FIFO 610. If a valid circuit ID is stored in the receive TRACE FIFO 610 for a particular circuit, the ID of the partner circuit has been previously received. As such, the identity of the cross-connected circuits is already known, and the scanning operation need not be repeated 308 for this circuit connection. Although not required, it may be desirable to perform a re-scan operation for the particular circuit connection.

If a circuit ID is not currently stored in the receiver TRACE FIFO 610 for a selected circuit, the shelf controller determines whether a patch cord has been inserted into either of the Patch IN or Patch OUT jacks. In particular, if a circuit ID is not currently residing 310 in the receive Patch IN FIFO 612 for the selected circuit, the shelf controller determines 312 whether the Patch IN jack is occupied, and if so, adds 314 the Patch IN ID to the transmit patch IN FIFO 622 of the Transmit Table for the selected circuit.

Figure 19:
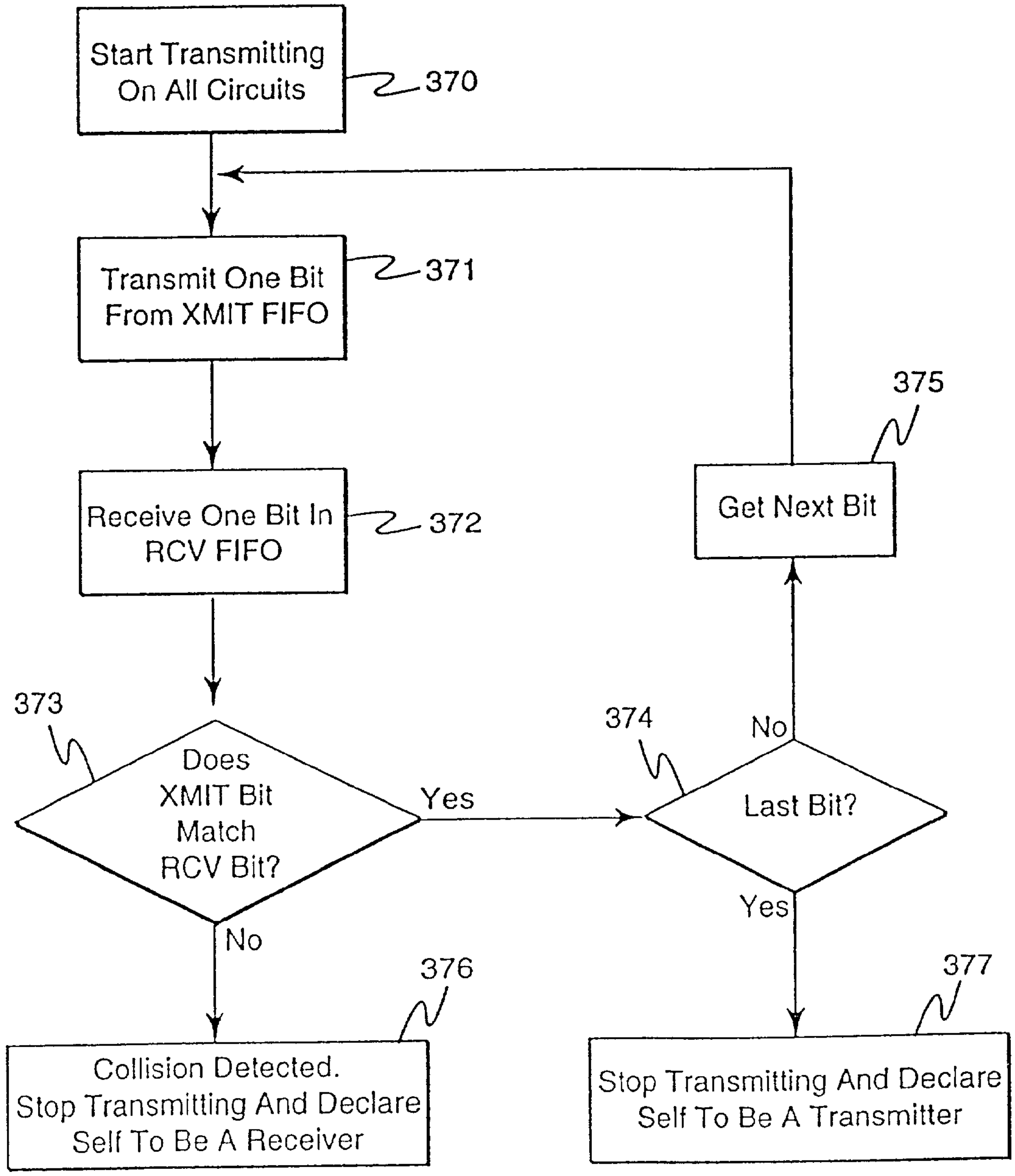

If a valid circuit ID currently resides in the receive Patch OUT FIFO 614 for the selected circuit, the ID of the partner circuit has previously been received and the scanning operation need not be repeated for this circuit connection, although it may prove desirable to re-scan the circuit connection. If not, the Patch OUT jack is sensed 318, and if occupied, the shelf controller adds 320 the Patch OUT ID to the transmit patch OUT FIFO 624 of the Transmit Table for the selected circuit. All circuits coupled to the shelf controller are similarly processed 322. After processing all of the respective circuits associated with the shelf controller, the scanning procedure generally depicted in FIG. 19 is initiated 324. The shelf controller reports 326 completion of the scanning procedure 324 to the main computer upon completion.

It is to be understood that the general principles of the scanning approach described herein may be implemented in a manner which does not require interaction with a Transmit Table of the type previously described, but that the description of such a Transmit Table is provided for illustrating one of several approaches for implementing the present invention. Having completed the Transmit Table loading procedure depicted in FIGS. 17-18, the scanning procedure depicted in FIG. 19 is initiated by all shelf controllers in a contemporaneous, parallel manner.

In accordance with this procedure, all circuits within the cross-connect system transmit their respective full circuit ID codes according to the procedure illustrated in FIG. 19. In particular, all shelf controllers transmit ID and other information for those circuits having circuit ID codes currently loaded in the Transmit Table. These transmissions can take place over several circuit paths simultaneously, such as over the TRACE conductor or the Patch IN and OUT conductors.

Collisions are resolved using the approach depicted in FIGS. 20-23C. To reiterate a significant advantage realized through employment of the instant scanning technique, all circuit connections are scanned and identified within the time it takes to transmit a single cross-connect circuit ID bit string, regardless of number of circuits utilized within the cross-connect system.

A "listen before transmitting" approach is employed during the scanning operation in an attempt to minimize collisions and transmissions across the scanning bus. If a transmission is detected on a connection coupled to a particular circuit identified in the Transmit Table, the transmitting circuit is prevented from making further transmissions and its ID is removed from the appropriate transmit FIFO 618 of the Transmit Table. In this situation, the incoming transmission is typically, if not exclusively, a circuit ID being communicated from a partner (i.e., cross-connected) circuit.

Because the circuit IDs for the pair of cross-connected circuits is known by referencing the appropriate receive FIFO 608 of the receiving circuit, no further duplicative scanning need occur for this transmitting circuit. Such duplicative scanning, however, will advantageously result in the repetitive transmitting of a keep-alive signal to the receiver, as was previously mentioned. For those circuits in which transmission activity is not detected, the shelf controller instructs all such circuits to begin transmitting their respective IDs according to the procedure depicted in FIG. 19.

When a collision is detected on a particular circuit connection, a collision arbitration procedure is initiated whereby one of the two transmitting circuits (identified as a "transmitter") is permitted to continue transmitting its full ID, and the other circuit is instructed to cease its transmission. This circuit's ID is removed from the Transmit Table, and the circuit is identified as a "receiver" for subsequent transmissions, although it may be desirable to reset all circuits to "transmitters" and repeat the collision arbitration procedure for each subsequent transmission.

It will be appreciated that no further collisions will occur over the connection established between these two circuits, assuming that no change in hard-wired or patch connectivity occurs, because only one of the two circuits (i.e., the transmitter circuit) is permitted to transmit its circuit ID and other information during subsequent scanning operations. The receiver circuit, which has been instructed by the shelf controller not to transmit its ID over the present connection during subsequent scans, receives and stores the transmitter circuit's ID, and, when instructed, communicates this ID information and its own ID information to the main computer.

Any change in hard-wired or patch connectivity with respect to a particular circuit, regardless of whether the circuit is identified as a transmitter or receiver, is detected by the shelf controller. In such a case, the new connection will be scanned in the same manner as those associated with circuits previously loaded in the Transmit Table. In this case, the implicated circuits lose their respective "transmitter" or "receiver" identifications. As such, any modification to an existing connection or addition of a new connection will be detected and identified within a subsequent single scanning period (i.e., the time it takes to transmit a single cross-connect circuit ID bit string).

Figures 20, 21A, 21B:
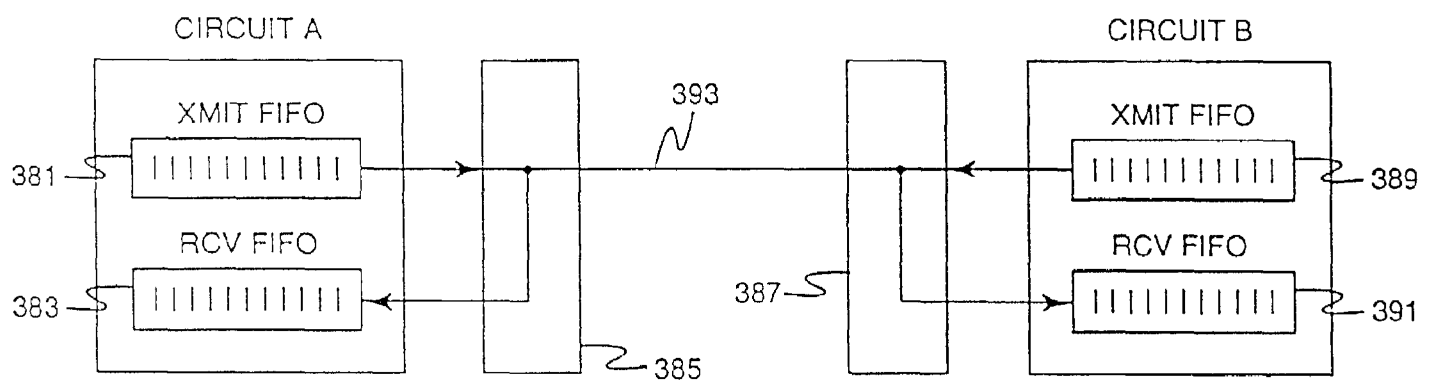
FIG. 20 is an illustration of transmit and receive registers and a collision detection circuit associated with a pair of cross-connected circuits which are used to facilitate the implementation of the scanning methodology depicted in FIGS. 17-19.
FIGS. 21A-21B illustrate state tables associated with the respective circuits A and B illustrated in FIG. 20, the tables depicting the state of the transmit and receive registers and the efficacy of collision detection during implementation of the scanning methodology depicted in FIGS. 17-19.

Referring to FIG. 19, the circuit ID transmission and collision arbitration steps in accordance with the first embodiment of a scanning methodology will now be described in greater detail. FIGS. 20-21B will also be referred to in this discussion. FIG. 20 is an illustration of two cross-connected circuits each including respective transmit (XMIT) and receive (RCV) FIFOs 381, 389 and 383, 391 coupled to respective collision detection circuits 385, 387. The pair of circuits A and B are connected via an information signal connection (not shown) and a TRACE bus connection 393. FIGS. 21A, 21B depict in table form the state of the XMIT and RCV FIFOs 381, 383, 389, 391 of circuits A and B when simultaneously transmitting circuit ID information over the TRACE bus connection 393.

FIGS. 21A, 21B also indicate the occurrence and resolution of a collision in accordance with one embodiment of a collision arbitration scheme which utilizes the circuit 395 illustrated in FIG. 22. It is understood that the receiver/transmitter circuit 395 shown in FIG. 22 may be used in either a dedicated mode or a multiplexed mode of operation. In a dedicated mode, a receiver/transmitter circuit 395 is connected to each of the TRACE, Patch IN, and Patch OUT connections (i.e., three individual circuits 395). In a multiplexed mode, a single receiver/transmitter circuit 395 is selectively connected to any of the TRACE, Patch IN, and Patch OUT connections.

A timing diagram which characterizes the operation of the receiver/transmitter circuit 395 is provided in FIGS. 23A-23C. The circuit shown in FIG. 22 constitutes a tri-state, open collector, digital transceiver, where the active state is represented by a logic 0 (e.g., ground), and an open/inactive state is represented by a logical 1 (e.g., $V_{CC}$).

If the cross-connect circuits at both ends of a TRACE bus connection transmit the same signal (i.e., a 1 or 0), then no difference between the transmitted and received signals is detected by the collision detection circuit 395, and a collision is deemed not to have occurred. However, if both circuits transmit opposite signals, a collision will be deemed to have occurred by one of the circuits. The cross-connect circuit transmitting the logic "0" will be given priority and is permitted to continue transmitting its ID code, while the partner circuit will detect a signal mismatch or collision condition and is prevented from further broadcasting its ID code. Transmitting a logic "0" overrides the state of the bus and pulls the bus "low."

It is noted that the receiver 397 of the collision detection circuit 395 is active during times when the transmitter 399 is inactive (i.e., times $t_1$, $t_2$, $t_3$, $t_4$, . . . $t_n$). During the time in which the receiver 397 is active, such as time duration $t_1$ for example, the receiver 397 monitors the TRACE bus connection 393 in order to detect the presence of a transmission thereover. The receiver 397 typically samples the TRACE bus connection 393 repetitively during each time period of transmitter inactivity. In this manner, a listen before transmit approach to effecting communications between cross-connected circuits is realized.

As was discussed previously, all circuits having IDs loaded in the Transmit Table (i.e., a circuit's transmit FIFO 620, 622, or 624) for all shelves within the cross-connect system begin transmitting 370 their respective IDs in parallel. In particular, each circuit transmits 371 its ID information one bit at a time from its associated transmitter FIFO 618. For example, and with reference to FIGS. 21A, 21B, if both circuits A and B transmit 371 a logic 1 as the first bit of their respective IDs from their respective transmit FIFOs 381, 389, and both circuits A and B receive 372 a logic 1 bit in their respective receive FIFOs 383, 393, no difference between the transmitted and received signals is detected 373 by the collision detection circuits 385, 387. As such, no collision is deemed to have occurred. The same result occurs when both circuits A and B transmit 371 a logic 0 as the second bit of their respective IDs. Subsequent ID bits transmitted by circuits A and B are similarly tested 374, 375.

Because each circuit ID with a cross-connect system is unique, a collision will eventually occur on the TRACE bus connection 393 coupling circuits A and B during the scanning operation. For example, if circuit A transmits 371 a logic 0 as the third bit of its ID and circuit B transmits 371 a logic 1 as the third bit if its ID, a mismatch between transmitted and received ID signals is detected by the collision detection circuit 387. In accordance with the collision arbitration scheme of this embodiment, the circuit transmitting a logic 0 is given priority (i.e., overrides the bus state) over the circuit transmitting a logic 1.

As such, circuit A is permitted to continue transmitting its ID undisturbed. Circuit B, on the other hand, is instructed to halt all subsequent ID transmissions during the existence of the present connection (i.e., no change in hard-wired or patch connection status), and is thereafter identified as a "receiver" circuit. It is noted that circuit A continues to operate as a "transmitter" circuit during the current and subsequent scanning operations, although no formal procedure to identify same is required.

Importantly, the circuit ID bit information stored in the "receiver" circuit, which in this illustrative example is circuit B, precisely corresponds to the circuit ID bit information transmitted by the "transmitter" circuit, in this case circuit A. Since only the receiver circuit reports circuit ID information for both transmitting and receiving circuits to the main computer, it is significant that the collision arbitration scheme of the instant scanning methodology is non-destructive, and ensures that the transmitting circuit ID and related information is received with 100% integrity.

As was previously mentioned, no further collisions will occur over the TRACE bus connection established between circuits A and B, assuming that no change in hard-wired or patch connectivity occurs, because only the transmitter circuit is permitted to transmit its circuit ID and other information during subsequent scanning operations. Using this scheme, all circuit connections will be known within the time it takes to transmit a single circuit ID bit string, regardless of the size of the cross-connect system.

Under nominal operating conditions, there is generally no need for a receiving circuit to ever transmit its ID information as long as the present connection is maintained. In the special case where a pair of patch cords have been incorrectly patched to different circuits, there exists the possibility that two simultaneous circuit IDs may be received on the two patch paths connected to the common circuit. In a configuration in which a single receiver of the shelf controller is multiplexed across the three circuit paths of the circuit, namely the TRACE, Patch IN, and Patch OUT paths, such a misconnection condition may be detected and remedied automatically by the shelf controller. In such a case, the shelf controller detects that there is a communications error on both the Patch IN and Patch OUT paths.

In response, the shelf controller switches the receiver multiplexer to connect with one of the two patch paths, and waits for the next circuit ID to arrive. During the ensuing dead time, the shelf controller then transmits the selected patch path's circuit ID, so as to cause the partner circuit at the opposing end of the patch cord to cease transmitting its ID information in a manner previously described.

Figure 24:
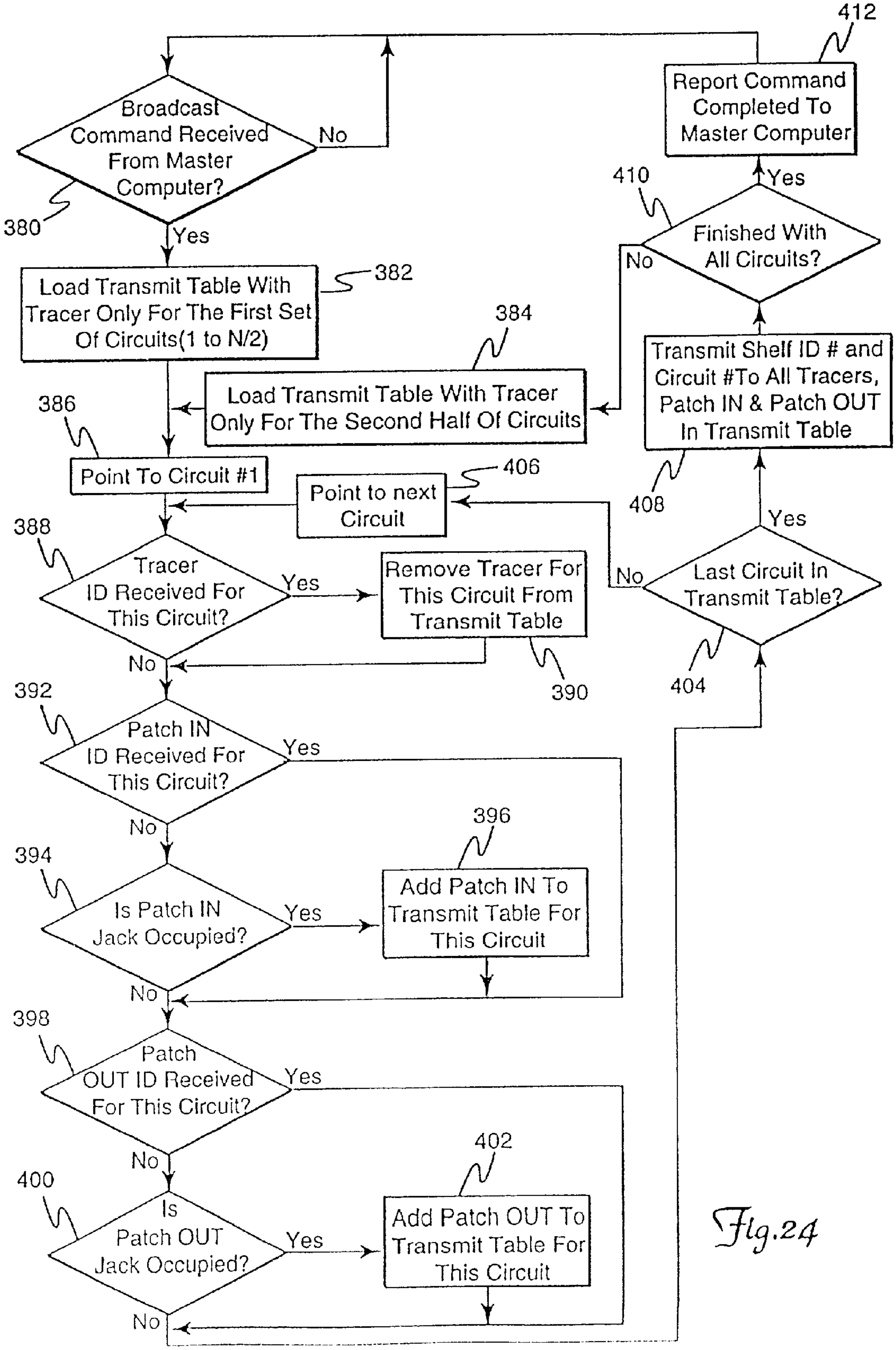
FIGS. 24-25 depict in flow diagram form various process steps associated with a scanning methodology in accordance with a second embodiment of the present invention.
Figure 25:
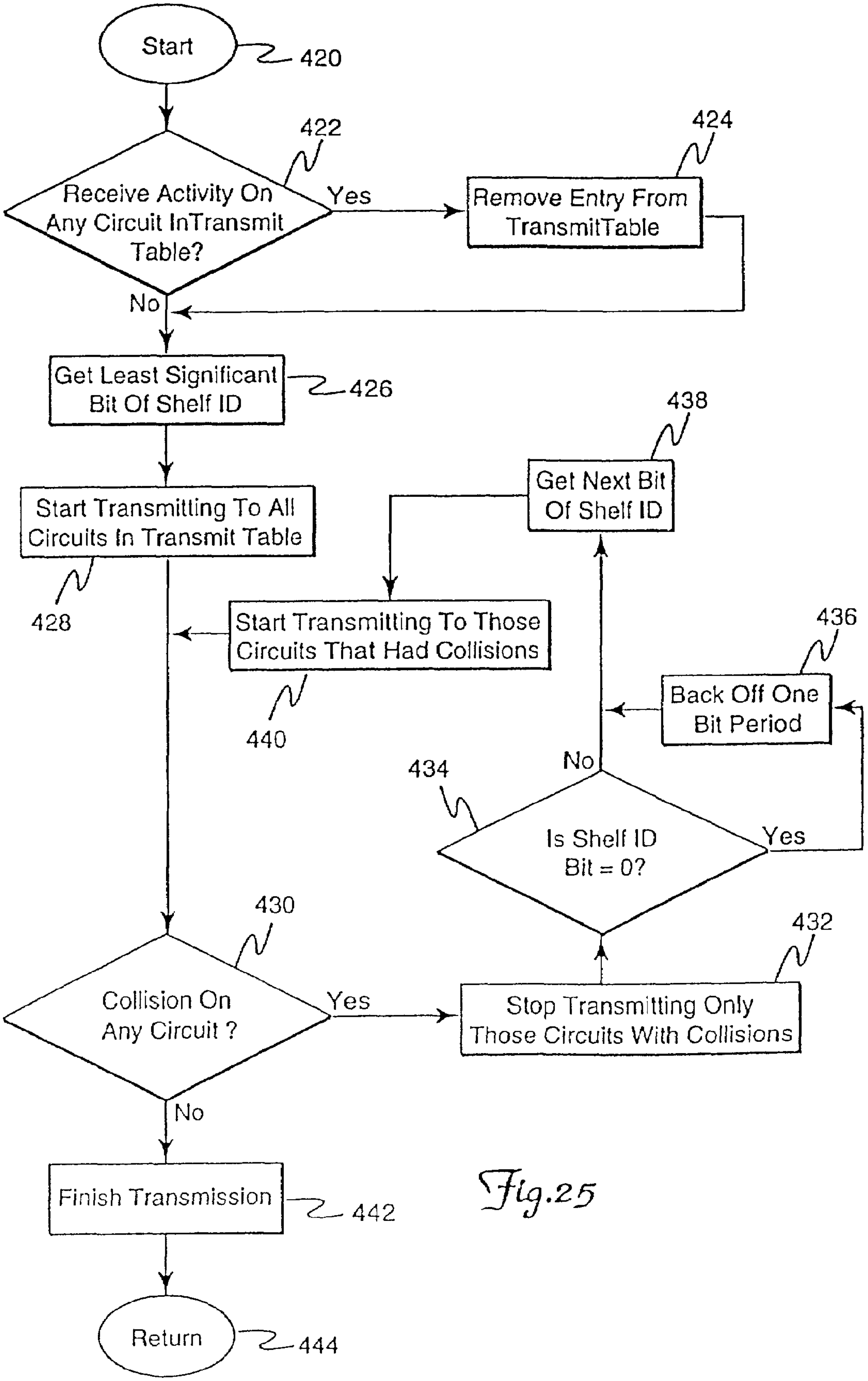

Turning now to FIGS. 24-25, there is illustrated in flow diagram form an alternative embodiment of a methodology by which connection information is acquired for all connections established through a cross-connect system. Upon receiving a broadcast command received from a main computer 380, the Transmit Table (e.g., transmit TRACE FIFOs 620) is loaded 382 with TRACE ID information for a first set of circuits for each shelf. By way of example, if N represents the total number of circuits comprising each shelf, then the first half or N/2 circuits have their associated TRACE IDs loaded into the Transmit Table. It is noted that circuit groupings other than N/2, such as N/4 or N/10 for example, may be employed.

The operations of steps 386 through 406 are then executed for each circuit of the first set of circuits. These steps are substantially the same as steps 304-323 discussed previously with respect to FIGS. 17-18 and, for purposes of brevity, will not be further described. When the first half or N/2 of circuits within the respective shelves have been processed 410, the Transmit Table is loaded with TRACE IDs of the second half or N/2 of circuits 384. After processing the second half of circuits in a similar manner as that described hereinabove, the scanning operation depicted in FIG. 25 is executed 408, the completion of which is subsequently reported 412 to the main computer.

FIG. 25 depicts a number of process steps involved in the transmission of circuit ID information in accordance with the second scanning approach. The second scanning methodology involves a learning phase during which the system determines whether and when each circuit is authorized to transmit or receive ID information within the overall scanning period. A scanning period within the context of this illustrative embodiment is made up of 2 to N transmit cycles, where N equals the number of bits in the circuit ID.

During the learning phase, for example, circuit number 1 of shelf 1 for all equipment bays broadcasts its ID information to its partner. This process is repeated for circuits 2 through circuits N/2 for all N circuits in all shelves within the equipment bay. Within the transmit period of 2-to-N/2 cycles, all of the potential 1-to-N circuits within a shelf will have broadcasted their current ID information for the entire system.

During the learning phase, data collisions could occur when two circuits broadcast their respective circuit IDs at the same moment in time. By way of example, this would typically happen when circuit 1 of shelf 1, bay 1 is connected to circuit 1, shelf 1 of bay 2. The learning methodology in accordance with this embodiment is designed to minimize the number of collisions. These data collisions are resolved through a shelf number priority scheme, such that a circuit with a lower shelf number becomes a "receiver," and the circuit with the higher shelf number becomes the "transmitter," or vice versa.

Assuming that at least one collision has occurred and based on the length of the shelf ID, the learning phase may require a minimum of two transmit cycles to complete, plus additional time for collision resolution. It is estimated that the total elapsed learning time is likely to be less than 50 milliseconds based on a transmission speed of 19,200 bps.

After completion of the learning phase, the shelf controller will have determined the particular transmit cycle within which each circuit is permitted to transmit or receive data without causing a collision. All of the connection status information is reported back to the main computer over a data bus during this learning phase. The system then enters an operating or monitoring phase, wherein transmission of circuit identification information will continue to occur in the 2-to-N transmit cycles so as to continually verify circuit connection status. A key distinction between the monitoring and learning phases within the context of this embodiment is that collisions may only occur during the monitoring phase if there is a change in connection status, and only changes in such status are reported to the main computer.

After initiating 420 the scanning procedure illustrated in FIG. 25, each connection is monitored to detect the presence of a transmission over the connection. If a transmission is detected 422 on a connection associated with a particular circuit identified in the Transmit Table, the transmitting circuit is prevented from making further transmissions and its ID is removed 424 from the appropriate transmit FIFO 618 of the Transmit Table.

For those circuits which do not detect transmission activity, the shelf controller instructs all such circuits to begin transmitting 426 the least significant bit of the shelf ID prior to the circuit ID in an attempt to minimize the occurrence of a collision early on in the scanning process. As with other scanning procedures, shelf and circuit ID information may be transmitted over several circuit paths simultaneously, such as the TRACE conductor or the Patch IN and OUT shield conductors.

If a collision is detected 430 on any circuit connection, the implicated circuits are instructed to halt 432 their respective transmissions, and a collision arbitration operation is initiated in the following manner. If the shelf/circuit ID bit transmitted by a particular circuit is equal to 0, as is tested at step 434, this circuit is permitted to transmit 438, 440 a subsequent shelf/circuit ID bit, while its partner circuit is delayed 436 from transmitting its shelf/circuit ID bit by one bit period.

It is noted that a bit period within this context is defined as a duration of time required to transmit one of a total of N shelf/circuit ID bits, where N represents the total number of bits constituting the shelf/circuit ID. The process of steps 430-440 continue for subsequent bit periods until a difference between the shelf/circuit IDs of the transmitting pair of circuits is detected. The bit period during which no collision is detected is stored, and the transmission of shelf/circuit IDs by the circuits continues until the entire ID bit streams of both circuits have been transmitted 442.

To summarize, collisions are resolved by using the shelf and circuit IDs to decide which circuit of the connection has higher priority. Once the initial learning phase has been completed, the scanning algorithm will continue to transmit data in 2-to-N transmit cycles. This provides for the continued verification of all connections. Should any collisions occur, they will be resolved in the above-described manner. Since the scanning of all shelves proceeds in parallel, the overall scan time is not affected by the total size of the cross-connect system.

FIG. 24 illustrates that the operation of loading a Transmit Table with circuit ID information takes into consideration whether various bantam jacks are occupied, such as the Patch IN/OUT jacks, in which case additional circuits IDs are loaded into the Transmit Table for these circuit paths. A Transmit Table may be loaded with between one and N circuits of information for each shelf.

In accordance with one exemplary scenario, the Transmit Table may be loaded with information concerning all circuits, as was previously described with respect to FIGS. 17-18 or, alternatively, loaded with information concerning circuits 1 through N/2, as was described above with respect to FIG. 24. Another scenario may involve loading the Transmit Table with a single circuit ID for each shelf (e.g., circuit 1 for shelf 1, circuit 2 for shelf 2, etc.). After the Transmit Table is loaded in this manner, the scanning operation depicted in FIG. 25 may be initiated. When the scanning operation is completed for the first set of circuit IDs, the load Transmit Table function will resume with loading of the next set of circuit IDs and a subsequent scanning operation will be performed using this next set of circuit IDs. This process is repeated until all circuit IDs have been transmitted.

Figure 26:
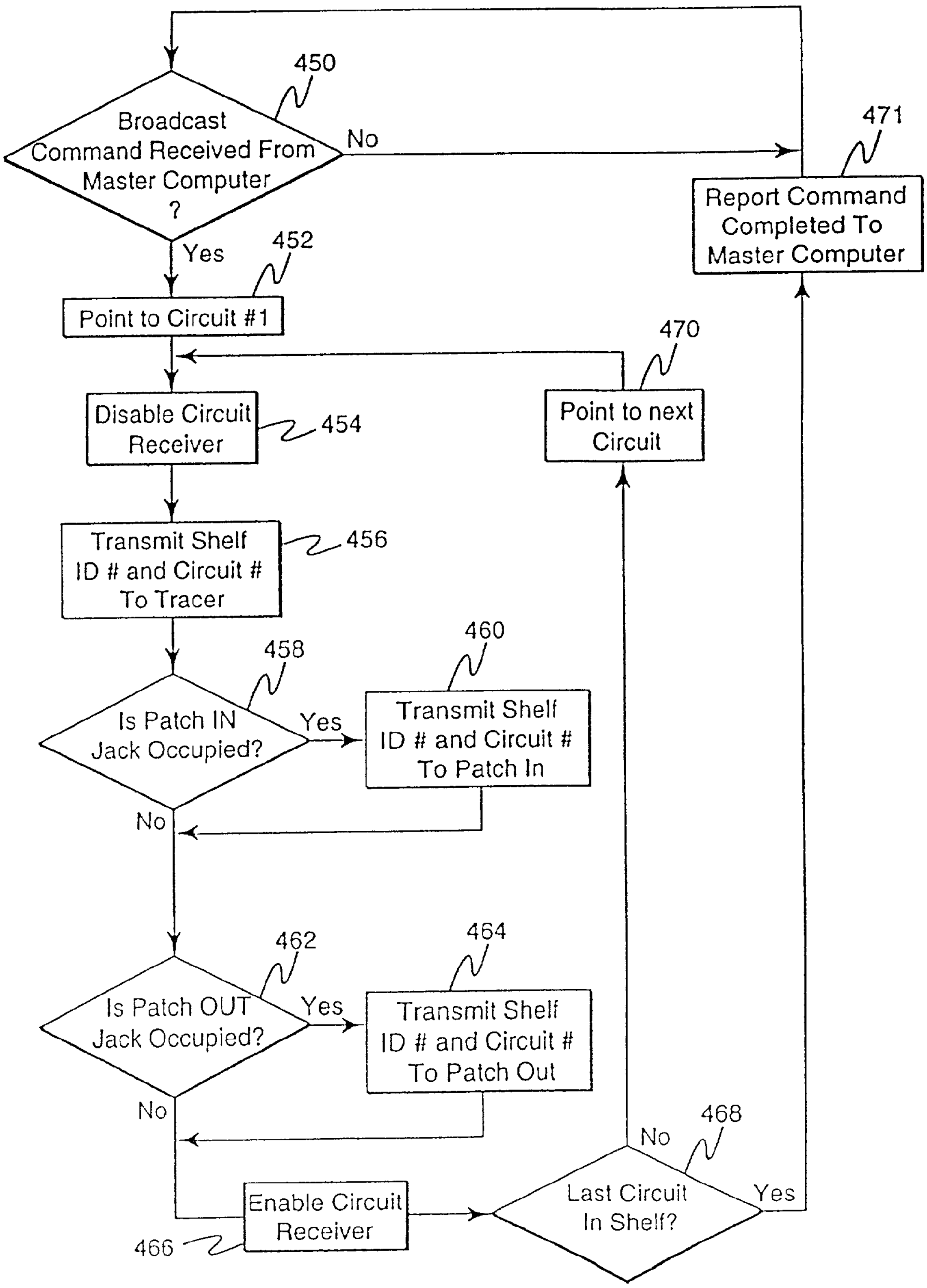
FIG. 26 illustrates various process steps associated with a scanning methodology in accordance with a third embodiment of the invention.

Referring now to FIG. 26, there is illustrated a third embodiment by which connection information is determined for all circuits within a cross-connect system. In accordance with this embodiment, the shelf controllers sequentially scan through all circuits of each shelf in such a way as to preclude the occurrence of a collision. The advantages of avoiding collisions, however, come at the cost of an increase in scanning time when compared with the relatively short scan times associated with the above-described first and second scanning approaches.

The third scanning approach depicted in FIG. 26 includes a learning phase and a monitoring phase. During the learning phase, which is initiated upon receiving 450 a broadcast command from the main computer, the system determines the particular transmit cycles of a scanning period during which each circuit is authorized to transmit its circuit ID information. Within the context of this embodiment, a scanning period is defined by a number of scanning cycles, which typically corresponds to the number of individual circuits comprising each shelf, (e.g., a maximum of 84 circuits per shelf corresponds to 84 scanning cycles per scanning period).

During the learning phase, circuit 1 of shelf 1 for all equipment bays broadcasts its ID to its partner circuit. Circuit 2 of shelf 2 for all equipment bays does the same. This is repeated for circuits 3 to n for all m shelves within each equipment bay. Assuming a scanning period of 84 cycles, for example, all of the potential 1-to-84 circuits within a shelf will have broadcasted their circuit IDs for the entire system during the scanning period.

While in the learning phase, data collisions could occur when two circuits broadcast their respective circuit IDs at the same moment in time. This would happen when circuit 1 of shelf 1, bay 1 is connected to circuit 1, shelf 1 of bay 2. These data collisions are resolved through a serial number priority scheme such that the circuit with the lowest serial number priority is moved to a different scanning cycle within the scanning period of 84 cycles. The learning phase will thus take two complete periods containing 84 data scanning cycles each. Once the learning phase is completed, each circuit will know which cycle it is permitted to transmit in without causing a collision. All of the connection status information is reported back to the main computer over the data bus during the learning phase.

After receiving 450 a broadcast command from the main computer, each of the shelf controllers selects a respective first circuit 452 housed within the shelf. The receiver is disabled for the selected circuit, and shelf ID and circuit ID information is transmitted 456 to the TRACE conductor. If the Patch IN jack is occupied 458, the shelf ID number, circuit number, and Patch IN occupied information is transmitted 460 over the patch cord shield conductor.

If the Patch OUT jack is occupied 462, the shelf ID number, circuit number, and Patch OUT information is transmitted 464 over the patch cord shield conductor. The receiver of the selected circuit is then enabled 456, and the shelf controller selects another circuit for processing 468, 471. The scanning steps 454-471 are repeated until all circuits have been processed, after which the bay controller reports completion of the operation 470 to the main computer.

Referring to FIGS. 27 and 28, a monitoring procedure is described which may be implemented by each shelf controller as a means of locally detecting and reporting changes in connection status for all connections established through the shelf controller. A connection change may constitute the establishment of a new connection or the removal of an existing connection, irrespective of whether the connection is a hard-wired or patch connection. Monitoring of all connections to detect any such changes proceeds simultaneously with respect to the scanning operations described previously. Table 2 provided above provides an example of various types of information which may be maintained and updated in the local database of a shelf controller.

After all of the initial connections have been reported, the shelf controllers continuously monitor their respective connections to detect and report only changes in connection status, thereby reducing the amount of data that is communicated to the main computer and stored in the database.

Referring to FIG. 27, each shelf controller interacts with its local database, supported in a memory of the shelf controller, which contains connection information only for those circuits connected within the shelf. In determining whether any circuit connections have been lost, each of the shelf controllers selects a first local database entry 500 and determines 502 whether the selected connection has been refreshed, such that continuity is verified with no change in connection status. If so, the shelf controller selects 508 the next circuit entry in the local database.

If a particular connection has not been refreshed 502, the local database entry for the affected circuit is cleared 504, and the loss of connection information is reported 506 to the main computer. The loss of connection verification procedure depicted in FIG. 27 typically operates on a continuous basis, but may be selectively executed by the shelf controller or the main computer.

The process steps depicted in FIG. 28 describe a general methodology by which new connections with respect to a particular shelf are detected. If a message or partner circuit ID is received 520 for a particular circuit within a shelf, the shelf controller determines whether connection information for the circuit currently exists in the local database 522. If so, monitoring continues. If the connection information does not exist in the local database for the circuit, a local database entry is created 524 for this circuit, and the new connection information is reported to the main computer 526 when the shelf controller is next polled. The new connection monitoring function typically operates on a continuous basis, but may be selectively executed by the shelf controller or the main computer.

An important aspect of the present invention concerns a graphical user interface which permits a user to interact with the cross-connect system at many levels. Cooperation between the cross-connect database and the GUI provides features and functionality heretofore unavailable in conventional cross-connect systems. By way of example, and not of limitation, the graphical user interface provides a user the opportunity to participate in the management of all circuit records, and provides the ability to visually trace circuits from one system to another. A user is also given the opportunity to graphically display network topology as it relates to the cross-connect system or the scanning bus, and permits a user to pre-define and control patch sequences for restoring critical and other circuits in response to network outages.

The graphical user interface in combination with the cross-connect database permits continuous monitoring of all cross-connect circuits within a central office or telecommunications network, and provides near real-time connection status information with regard to changes made to any of the cross-connections. A number of database reports relating to circuit changes, customer names, circuit types, and the like may also be generated by a user. Other information including the definition of central office equipment connections, physical connection routes, termination and intermediate splice locations, and related transmission rate information may also be obtained and presented to the user via the graphical user interface.

Provided below in Table 4 are descriptions of various screens of information which may be obtained using a graphical user interface in combination with a cross-connect database in accordance with the present invention.

TABLE 4

| SCREENS | DESCRIPTION |
|---|---|
| Directory Tree | A directory tree display of the Cities/Central Office/Floor/Bay information that is currently defined within the cross-connect system |
| Bay Configuration | A setup screen to add/configure bays & shelves |
| Bay Display | A graphical representation of the installed bay, showing a bit-mapped view of the model type, with shelves as provisioned for that bay |
| Shelf Display | A graphical representation of the cross-connect shelf showing a bit-mapped view of the model type |
| Connection Status | An indication by a bright color that the circuit within the shelf display is provisioned (i.e. cross-connected) as opposed to idle. |
| Port Display | A screen that shows the "FROM-TO" database connection information for the port clicked |
| Multi-window | As each screen is clicked for Bay Display, Shelf and Port, the windows overlap one another. All windows being displayed are to be real-time updated - even if they are in the background |
| Setup-configure | A multi-layer screen that allows the user to identify new equipment bays, shelves or circuits that have been physically installed. In addition, even though cross-connect information is automatically sensed, the user will have the ability to define naming conventions used, and to enter certain database circuit specific information. |
| Import/Export | Screens and functionality are required to allow the user to import and export cross-connect database data to or from other sources |
| Warning | At any time that a connection is changed, either disconnected or added, a pop-up warning window is activated at the upper most level along with a sound alert (user selectable). Several levels of warning screens are defined - and all are required to be selectively turned on/off by the user. |

Figure 29:
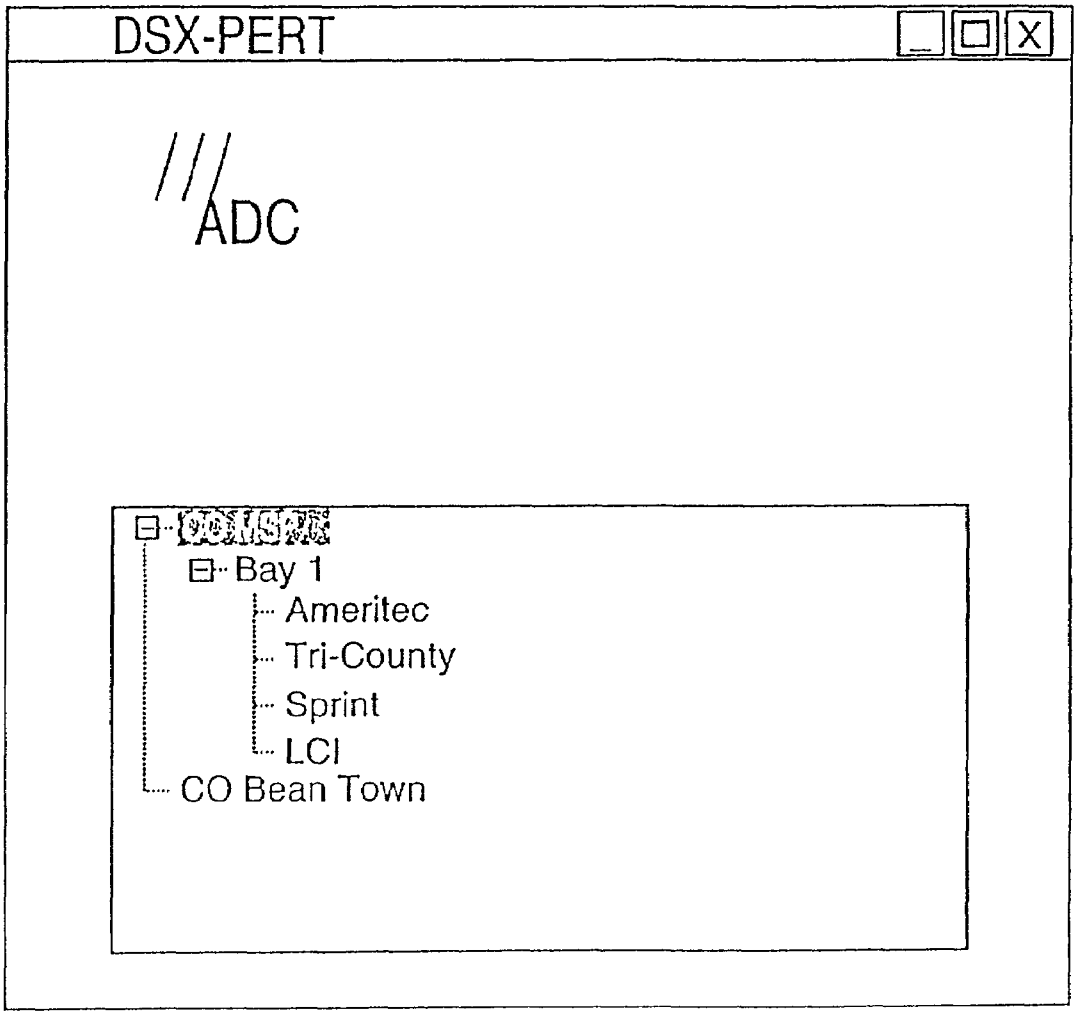
Figure 30:
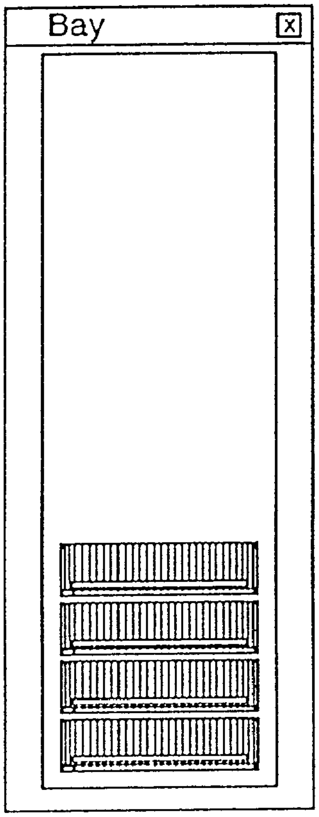

A directory tree, such as that shown in FIG. 29 for example, may be activated by a user to display cities, central office, floor, bay, and other related information that is currently defined within the cross-connect system. A bay configuration and display capability is also provided, such as that depicted in FIG. 30, in which a set-up screen may be used to add and configure new and existing bays and shelves. A graphical representation of the installed bay, showing a bit-mapped view of the model type, with shelves as provisioned for each bay, may also be viewable through use of the graphical user interface.

Figure 31:
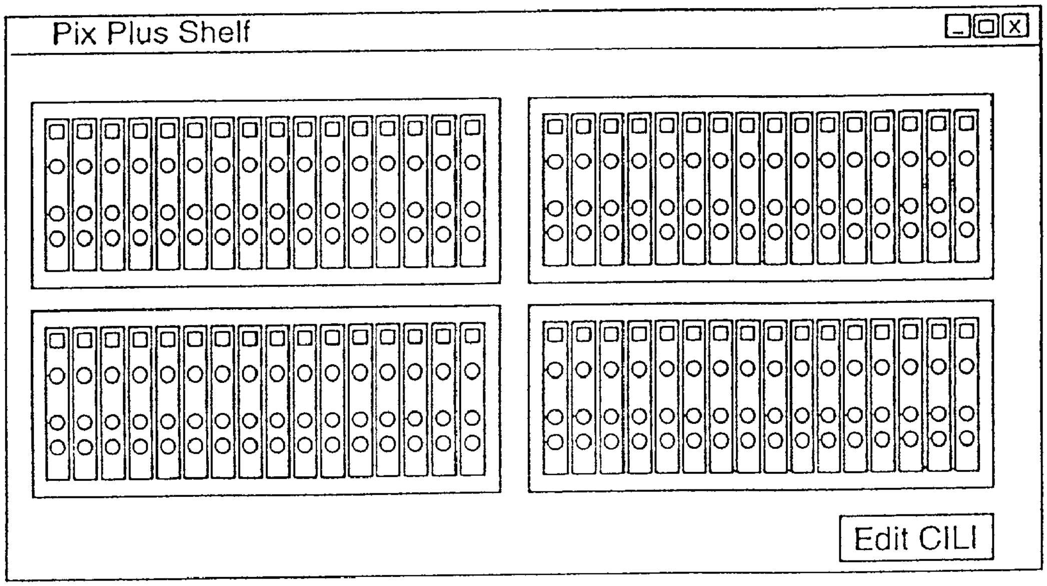
Figure 32:
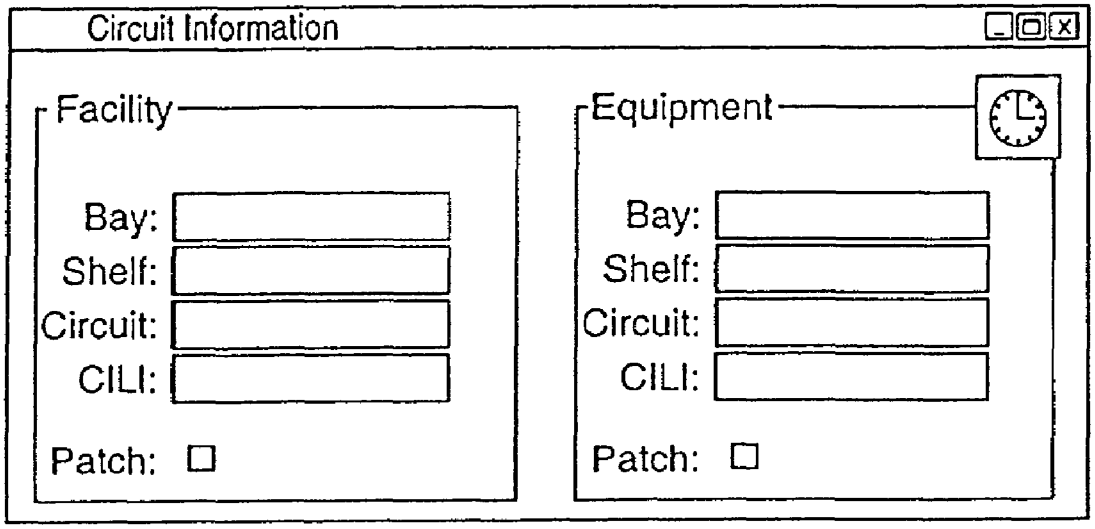
Figure 33:
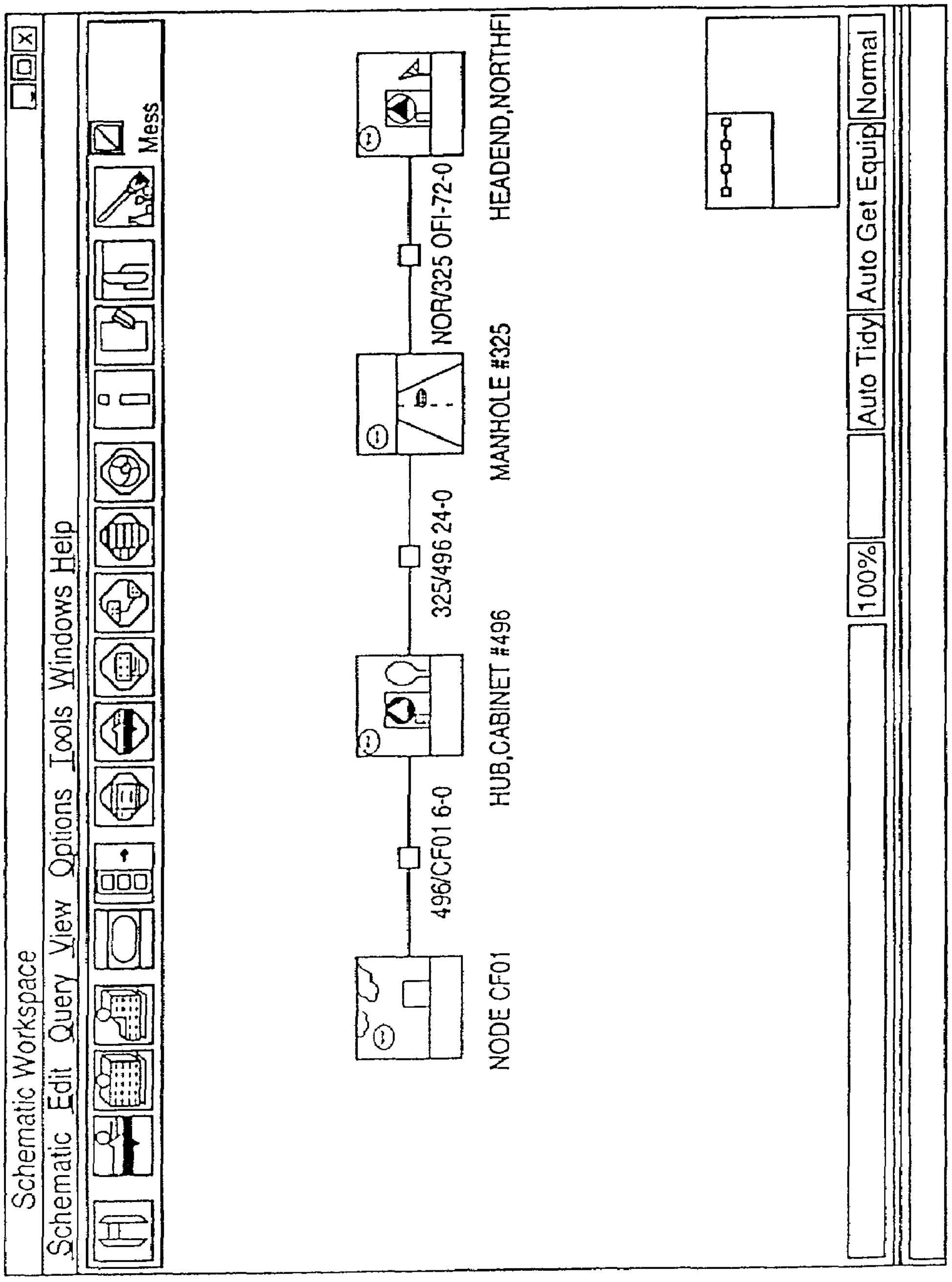
Figure 34:
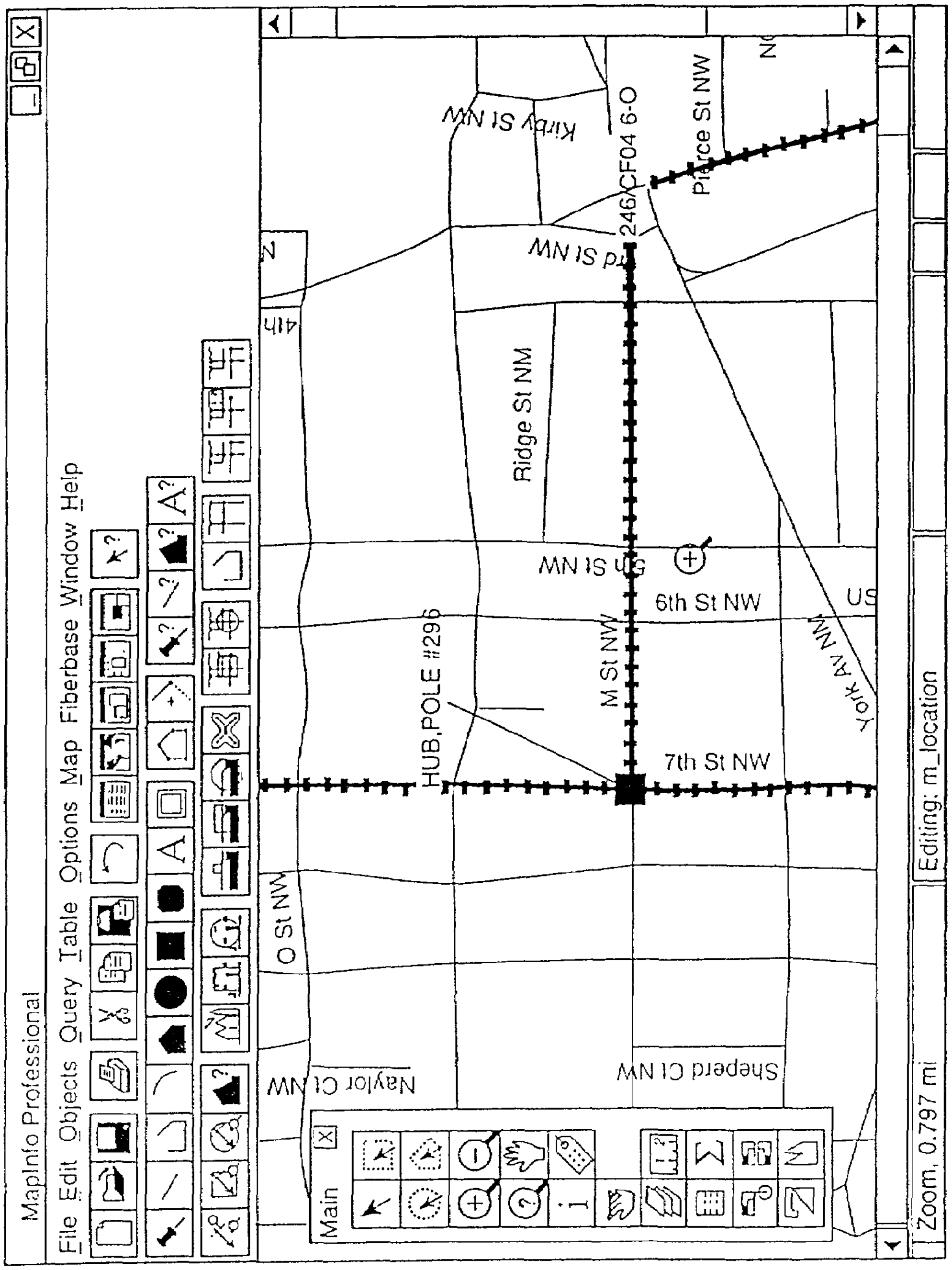

A graphical representation of a cross-connect shelf, such as that depicted in FIG. 31, provides a bit-mapped view of the shelf configuration and model type. Connection status information is also viewable, such as through a screen similar to that provided in FIG. 32, in which pertinent circuit identification and connection information may be viewed and edited. Circuit-to-circuit connection information may be viewed from a screen, such as that shown in FIGS. 33 and 34, by which all intermediate connections and connection equipment may be presented to a user.

Multiple window layouts and overlap configurations may be selected, in which each screen may be clicked on and off for bay, shelf, and port/circuit displays. The windows may overlap with one another, and all windows being displayed are updated on a near real-time basis, even if they are displayed in the background. Further, a multi-layer screen may be provided that allows the user to identify new equipment bays, shelves, or circuits that have been physically installed. In addition, even though cross-connect information is automatically sensed, the user may be given the ability to define naming conventions to be used, and may enter certain circuit-specific information into the database. Multiple levels of security is also provided which may be implemented in a manner analogous to various known multi-level network security schemes.

Figure 36:
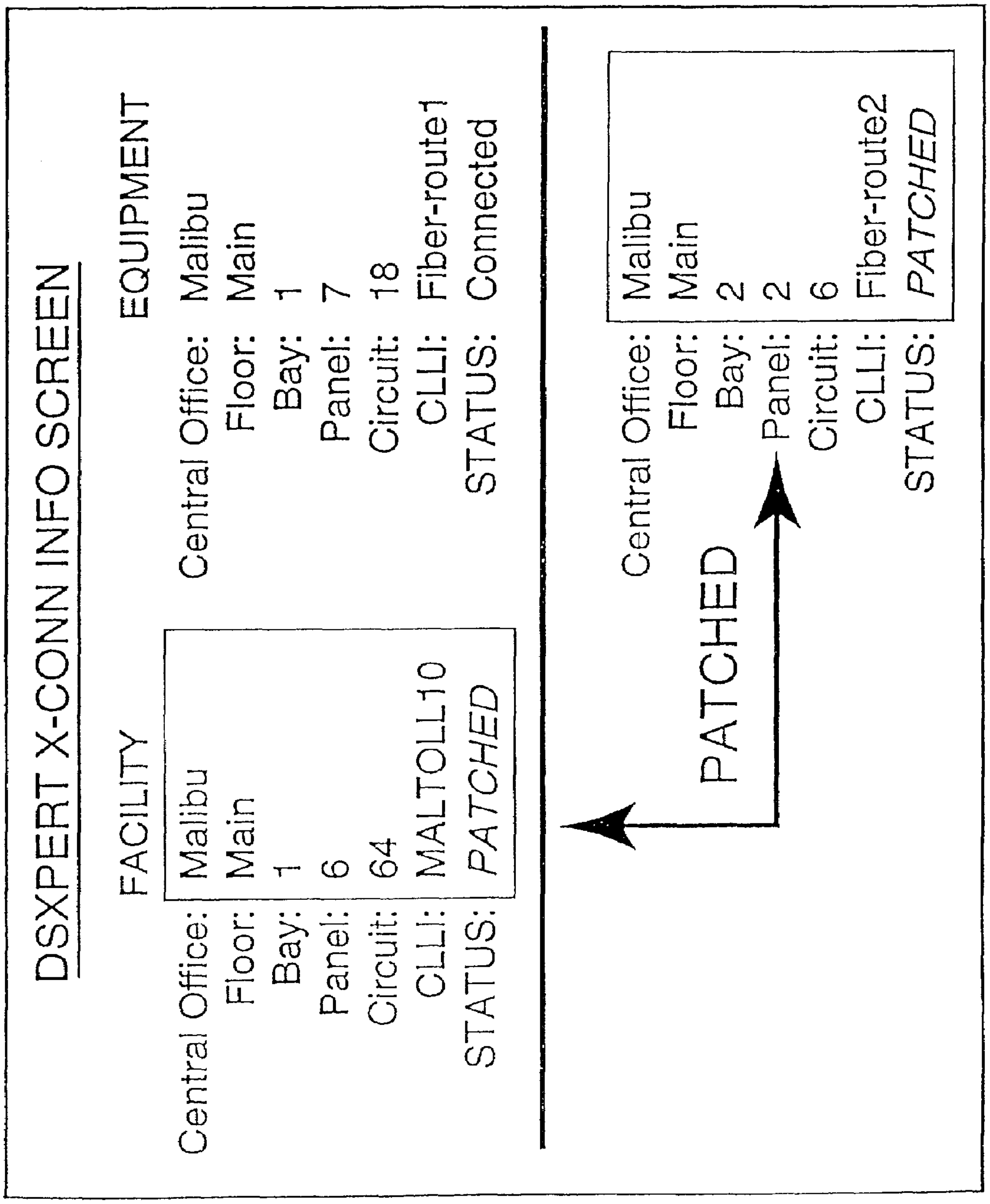

FIG. 35 illustrates connection information for a user selected cross-connection. It can be seen that a comprehensive set of data concerning each and every connection in a cross-connect system is maintained in the cross-connect database. FIG. 36 depicts a screen of the connection data shown in FIG. 35 which has been automatically modified to reflect the current state of the connection. In particular, the connection data shown in FIG. 36 includes currently active patch connection information in the foreground, and the currently inactive hard-wired connection information in the background.

Import/export screens and functionality may be provided which permits a user to import and export cross-connect database information to or from other sources, such as spreadsheets and other application programs. Also, connection change information indicating new or disconnected connections may be presented to the user through pop-up warning windows along with user-selectable audio alarms. Several levels of warning screens may be defined, which may be selectively turned on or off by a user.

The graphical user interface may be used to develop any number of patch pending files which, as discussed previously, define circuit patches required to maintain key connection integrity during network outages. Various outage scenarios may be simulated using the GUI, and a remedial patch pending file developed to address each particular outage scenario. The efficacy of a selected patch pending operation may be simulated by executing same in response to a particular simulated outage. The GUI may, of course, be used to execute an appropriate patch pending file in the event of an actual network outage.

A hand-held or otherwise portable computer may be used to interface with the intelligent cross-connect system for purposes of enhancing diagnostic, patching, and connection verification operations, for example. The portable unit includes an interface for physically connecting with the scanning bus, such as at the EIA-485 bus, and communicates with bay controllers and shelf controllers of interest. One particular operation well-suited for the hand-held unit involves controlling TRACE LEDs of selected cross-connect circuits as an aid to effecting a patch sequencing procedure. The hand-held unit may be used to perform a number of other useful operations through cooperation with the main computer during execution of a patch pending file.

The foregoing description of the various embodiments of the invention has been presented for the purposes of illustration and description. It is not intended to be exhaustive or to limit the invention to the precise form disclosed. For example, the scanning systems and methods described herein may be implemented in digital, digital/analog hybrid, and fiber optic or fiber hybrid cross-connect systems. Many modifications and variations are possible in light of the above teaching. It is intended that the scope of the invention be limited not by this detailed description, but rather by the claims appended hereto.

We claim:

1. A cross-connect system, comprising:

a plurality of termination elements through which cross-connections can be made;

a first communication medium communicatively coupling cross-connected termination elements of the plurality of termination elements, the first communication medium communicating user information signals between cross-connected termination elements of the plurality of termination elements;

a second communication medium communicatively coupling cross-connected termination elements of the plurality of termination elements that is separate from the first communication medium such that the user information signals are communicated only over the first communication medium, the second communication medium communicating connection information signals; and a processor coupled to the first and second communication mediums, the processor coordinating the communication of the connection information signals via the second communication medium and acquisition of connection information with regard to the cross-connected termination elements.

2. The system of claim 1, wherein the first communication medium comprises an optical communication medium.

3. The system of claim 1, wherein the second communication medium comprises an electrical communication medium.

4. The system of claim 1, further comprising at least one patch cord, the at least one patch cord comprising a first communication pathway and a second communication pathway, the first communication pathway providing communication of user information signals between a first termination element and a second termination element, and the second communication pathway providing communication of connection information signals to and from the first and second termination elements.

5. The system of claim 4, wherein the first communication pathway comprises an optical communication pathway.

6. The system of claim 4, wherein the second communication pathway comprises an electrical communication pathway.

7. The system of claim 1, wherein the processor is coupled to memory, the memory storing the connection information.

8. The system of claim 1, wherein the processor is coupled to memory and a user interface, the user interface cooperating with one or both of the processor and memory to display connection information.

9. The system of claim 1, wherein the processor is coupled to memory and a user interface, the user interface cooperating with one or both of the processor and memory to control at least one annunciator of selected ones of the plurality of termination elements.

10. The system of claim 1, wherein the processor is communicatively coupled to a user interface, the user interface situated geographically remote from the processor.

11. The system of claim 1, wherein the processor is communicatively coupled to a user interface, the user interface situated geographically remote from the plurality of termination elements.

12. The system of claim 1, wherein the processor is communicatively coupled to a hand-held user interface.

13. The system of claim 1, wherein the processor is coupled to memory, the connection information stored in the memory as a database of connection information.

14. The system of claim 1, wherein the processor is coupled to a user interface comprising a display, the user interface cooperating with the processor to display a graphical depiction of selected portions of the cross-connect system.

15. The system of claim 1, wherein the processor is coupled to a user interface comprising a display, the user interface cooperating with the processor to display a graphical depiction of selected ones of the plurality of termination elements.

16. The system of claim 1, wherein the processor is coupled to a user interface, the user interface cooperating with the processor to control one or more annunciators of selected ones of the plurality of termination elements.

17. The system of claim 1, wherein the processor is coupled to a user interface and each of the termination elements comprises one or more light emitting annunciators, the user interface cooperating with the processor to control the light emitting annunciators of selected ones of the plurality of termination elements.

18. The system of claim 1, wherein the processor is coupled to a user interface, the user interface cooperating with the processor to control one or more annunciators of selected ones of the plurality of termination elements for guiding a technician when configuring the cross-connect system.

19. The system of claim 1, wherein the processor is coupled to a user interface, the user interface cooperating with the processor to control one or more annunciators of selected ones of the plurality of termination elements in response to execution of a pre-programmed sequence of patch operations to be performed by a technician.

20. A method of acquiring connection information for termination elements of a cross-connect system, comprising:

communicating, via a first communication medium, user information signals between cross-connected termination elements of the cross-connect system;

communicating, via a second communication medium separate from the first communication medium, connection information signals between the cross-connected termination elements of the cross-connect system, such that the user information signals are communicated only over the first communication medium; and acquiring connection information with regard to the cross-connected termination elements of the cross-connect system using the connection information signals.

21. The method of claim 20, wherein communicating the user information signals comprises optically communicating the user information signals via the first communication medium.

22. The method of claim 20, wherein communicating the connection information signals comprises electrically communicating the connection information signals via the second communication medium.

23. The method of claim 20, further comprising communicating user information signals between a first termination element and a second termination element via a first patch pathway, and communicating connection information signals to the first and second termination elements via a second patch pathway.

24. The method of claim 23, wherein communicating the user information signals via the first patch pathway comprises optically communicating the user information signals via the first patch pathway.

25. The method of claim 23, wherein communicating the connection information signals via the second patch pathway comprises electrically communicating the connection information signals via the second patch pathway.

26. The method of claim 20, further comprising storing the connection information as a database of connection information.

27. The method of claim 26, further comprising remotely accessing the database of connection information.

28. The method of claim 20, further comprising displaying connection information.

29. The method of claim 20, further comprising graphically displaying connection information for a selected portion of the cross-connect system.

30. The method of claim 20, further comprising controlling at least one annunciator of selected ones of the termination elements.

31. The method of claim 20, further comprising controlling one or more light emitting annunciators of selected ones of the termination elements for guiding a technician when configuring the cross-connect system.

32. The method of claim 20, further comprising controlling one or more annunciators of selected ones of the termination elements in response to execution of a pre-programmed sequence of patch operations to be performed by a technician.

* * * * *